June 1, 1943. S. L. GOLDSBOROUGH 2,320,861
SINGLE-POLE PROTECTIVE RELAYING SYSTEM
Filed Dec. 30, 1941 5 Sheets-Sheet 1

INVENTOR
Shirley L. Goldsborough,
BY
O.B. Buchanan
ATTORNEY

June 1, 1943.  S. L. GOLDSBOROUGH  2,320,861
SINGLE-POLE PROTECTIVE RELAYING SYSTEM
Filed Dec. 30, 1941  5 Sheets-Sheet 3
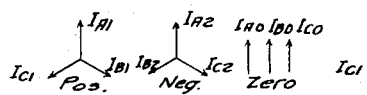
ØA to Gnd. fault.
Fig. 3a.
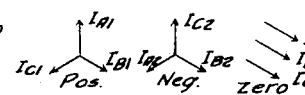
ØB to Gnd. Fault.
Fig. 3b.
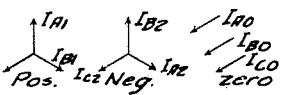
ØC to Gnd. Fault.
Fig. 3c.
Fig. 4.
Fig. 5.
Fig. 6.
Fig. 7.
WITNESSES:
E.A. McCloskey
W. C. Groome
INVENTOR
Shirley L. Goldsborough.
BY O.D. Buchanan
ATTORNEY June 1, 1943. S. L. GOLDSBOROUGH 2,320,861
SINGLE-POLE PROTECTIVE RELAYING SYSTEM
Filed Dec. 30, 1941 5 Sheets-Sheet 4

ØA Selector

ØB Selector

ØC Selector

Fig. 10. Unbalanced-Load Conditions—ØA Open

WITNESSES:
E. A. McCloskey
Wm. C. Groome

INVENTOR
Shirley L. Goldsborough.
BY O. B. Buchanan
ATTORNEY

Patented June 1, 1943

2,320,861

UNITED STATES PATENT OFFICE 2,320,861

SINGLE-POLE PROTECTIVE RELAYING SYSTEM

Shirley L. Goldsborough, Basking Ridge, N. J., assignor to Westinghouse Electric & Manufacturing Company, East Pittsburgh, Pa., a corporation of Pennsylvania Application December 30, 1941, Serial No. 424,957

30 Claims. (Cl. 175—294)

This application is a continuation-in-part of my application Serial No. 373,561, filed January 8, 1941, for Protective electrical systems.

My invention relates to protective relaying systems for protecting electrical transmission lines against faults. Various features of my invention, while developed for a specific relaying system, are of more or less general application in other protective relaying systems.

In its more specific aspects, my invention relates to a protective relaying system in which single-pole circuit-breakers are utilized; and means are provided for selectively responding, in the event of a fault between a single line-conductor and ground, and sometimes in the event also of a fault between two line-conductors and ground, and for accurately selecting the particular line-conductor or line-conductors which is or are grounded, for tripping out only the particular single-pole breaker or breakers which is or are in that line-conductor or line-conductors, thereafter immediately reclosing that particular circuit-breaker or circuit-breakers, and if the fault still persists on said line-conductor or line-conductors, all three single-pole circuit-breakers are then tripped and left open, without automatic reclosure. If the fault involves more than one of the three phase-conductors of the line (assuming a three-phase line), there is sometimes not sufficient advantage to warrant leaving the single sound line-conductor unopened, and one form of my relaying means is arranged, in such a contingency, to immediately open all three of the single-pole breakers, thereafter leaving said breakers open until they are reclosed by the station-attendant. In electrical systems in which fast relaying is provided in two successive sections of the line, it is practically necessary to utilize carrier-current relaying in order to secure simultaneous operation of the breakers at the two ends of each of the protected line-sections, and my invention further relates to various improvements in carrier-current relaying systems, adapting said systems to the special problems connected with my single-pole or double-pole tripping.

My single-pole or separate-pole switching-system has many advantages over the conventional gang-switching method in which all three poles of the circuit-breaker are operated whenever any fault occurs in the protected line-section, as my single-pole switching-method permits some power to be transmitted over the two sound phase-conductors of the line, (or in some instances, over a single sound phase-conductor), while a faulted line-conductor is being cleared, thus contributing quite materially to the maintenance of stability in the system, since approximately 57% of the normal rated load for the system can be transmitted for a short time through the two sound phase-conductors under such circumstances, and a smaller, though sometimes important, amount of power can be transmitted over even a single conductor of a system having a grounded neutral. The importance of obtaining the advantage of single-phase transmission through the two sound phase-conductors, while a single line-to-ground fault is being cleared, will be appreciated when it is understood that fault-analyses have shown that generally more than 60% of all faults which occur on a three-phase line involve only one phase-conductor and ground, and furthermore, many of these faults are self-clearing, so that the faulty conductor can be immediately and automatically restored to service, as is provided in my system.

One of the objects of my invention is to provide improved means for selectively responding to a fault-condition involving ground. Specifically, this ground-fault selecting-means comprises three single-phase directional elements for effecting a comparison of the phases of two of the phase-sequence components of the three-phase line-currents, as a means for selecting the particular line-conductor which is affected by a ground-fault condition, which ground-fault condition is determined, and checked up, by conventional ground-fault relaying means. Thus, I take advantage of the fact that the various phase-sequence components of the line-current vary in phase, with respect to each other, depending upon which line-conductor is subjected to a line-to-ground fault. Various alternative embodiments and detailed means are involved in carrying out this object of my invention.

Another object of my invention relates to the utilization of carrier-current relaying-apparatus which makes it possible to prevent a tripping operation at either end of a protected line-section, except in the event of an into-the-line-looking direction of the ground-fault line-current quantity at both ends of the protected line-section. Various alterations and rearrangements of the previously conventional carrier-current systems have been necessitated, including: rearranging the receiver-relay contacts which respond to the absence of carrier, and the various interlocking relays associated therewith, so as to make possible single-pole tripping, for single-phase ground-faults, and three-pole tripping for all other faults; rearranging, and resafeguarding, the means for interrupting carrier-current transmission in response to an into-the-line-looking direction of the phase-fault currents involving any two pairs of the three phase-conductors of the line; splitting the ground-fault trip-circuit into three separate paths, for the three single-pole circuit-breakers, through the respective ground-fault selector-contacts, with the proper interlocks and safeguards; properly safeguarding the ground-fault-selector back contacts by means of the back-contacts of ground-fault detector-means which is sufficiently insensitive not to respond to the expected error-current in the current-transformer neutral, but sufficiently sensitive to respond to any through ground-fault current, these back-contacts being utilized to block three-pole tripping as a result of any phase-relay response which may occur during the existence of a ground-fault involving only one of the line-conductors; providing a special slow-dropout relay which picks up whenever any ground-fault tripping-operation is obtained, said relay dropping out only after a predetermined time-delay thereafter, in order to affect special safeguards which are needed, in my system, as will be subsequently described; and providing a special interlock-system in connection with a carrier-receiver relay having an operating or tripping coil and a holding coil, arranged so that the tripping coil can be properly energized even though the phase-fault carrier-starter detectors may not respond during a ground-fault condition.

With the foregoing and other objects in view, my invention consists in the apparatus, combinations, parts, connections, systems, and methods hereinafter described and claimed, and illustrated in the accompanying drawings, wherein:

Figs. 3a, 3b and 3c are vector diagrams showing the phase-sequence components which are obtained with single-phase ground-faults on different ones of the three phase-conductors of the line;

Fig. 4 is a vector-chart showing the so-called watt-characteristic of each one of the three ground-fault phase-selector relays SA, SB and SC utilized in the system shown in Figs. 1 and 2;

Figs. 5 and 6 are diagrammatic views of system-conditions which will be referred to in the explanation of various phases of the operation;

Fig. 7 is a diagrammatic view of circuits and apparatus of a much simpler form of embodiment of my invention than that which is shown in Fig. 1, omitting the carrier-current apparatus and the reclosing means, and illustrating a different form of embodiment of the three ground-fault phase-selector relays, and their energizing-circuits and interlocks;

Fig. 10 is a set of vectors to which reference will be made in discussing the effect of unbalanced-load conditions with one of the line-phases open.

Figure 1:
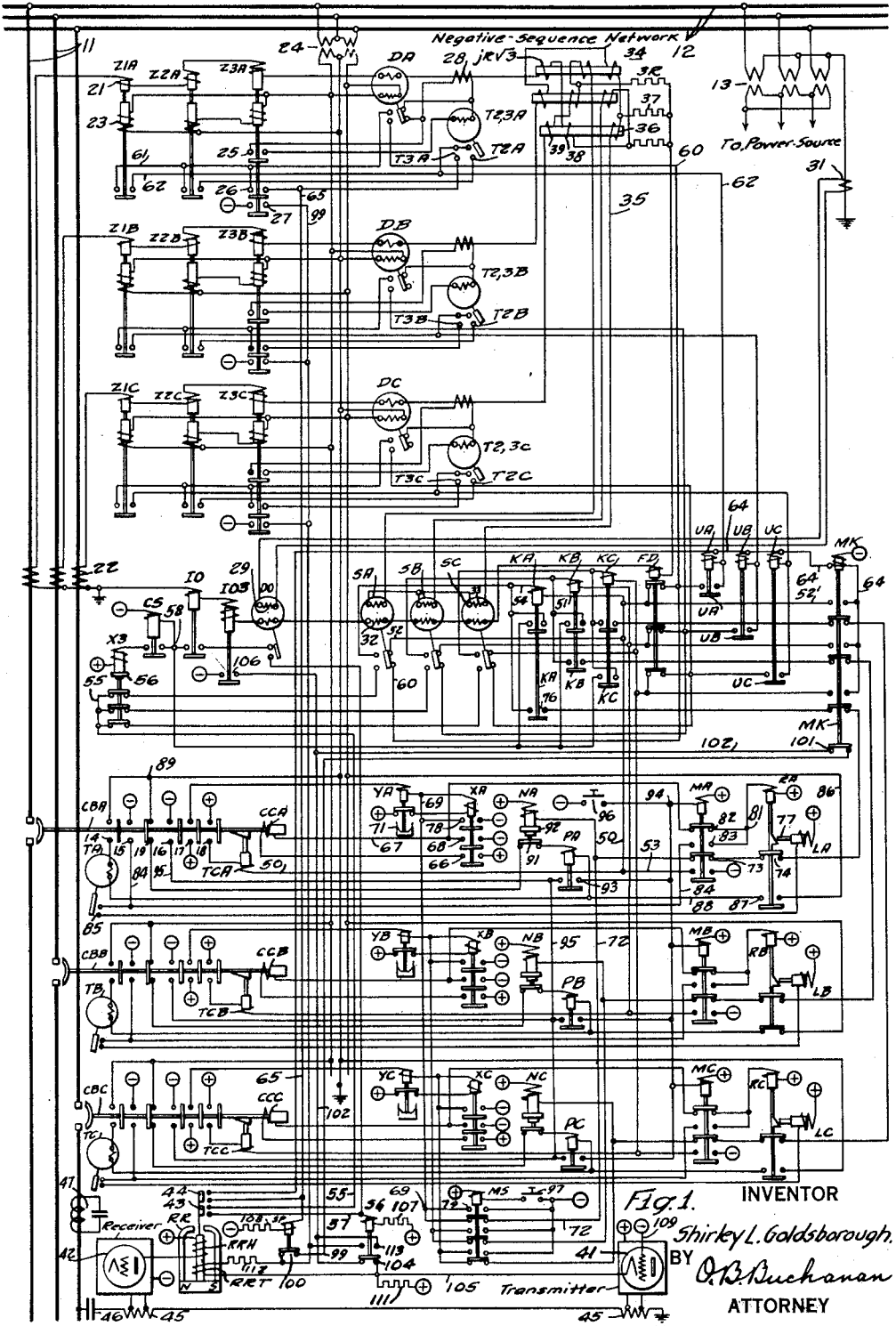
Figure 1 is a digrammatic view of circuits and apparatus embodying my invention in a preferred form.

In Fig. 1 I have illustrated my invention as being applied to the protection of a three-phase transmission-line 11 which is connected to a bus 12 to which power is supplied from a power-source through a stepup delta-star power-transformer 13. The three phase-conductors of the protected line 11 are provided with separate individual single-pole circuit-breakers CBA, CBB and CBC, respectively, which are provided with trip-coils TCA, TCB and TCC, and closing coils CCA, CCB and CCC, respectively. Each circuit-breaker is provided with auxiliary contacts of various kinds, including five make-contacts 14, 15, 16, 17 and 18, and one back-contact 19.

The line 11 is protected against phase-faults, or faults involving different pairs of line-conductors, or, in general, more than one line-conductor, by means of first, second and third-zone impedance-relays Z1, Z2 and Z3, for each of the phases, which are distinguished by the added letters A, B and C respectively. The impedance-relays have current-responsive operating-coils 21 which are energized from a set of star-connected line-current transformers 22, and voltage-responsive restraining-coils 23 which are energized from potential-transformers 24 connected to the bus 12. The first- and second-zone impedance-relays Z1 and Z2 are each provided with a single make-contact, which is sufficiently identified by designating the relay of which it is a part. The third-zone impedance-relays each have three make-contacts which are designated as 25, 26 and 27. The phase-fault impedance-relays for the various phases are associated with directional elements DA, DB and DC respectively, and also with timing relays in the form of synchronous motors T2,3A, T2,3B, and T2,3C, respectively, the timing relays each having a second-zone make-contact T2 and a third-zone make-contact T3, these relays being energized from auxiliary current-transformers 28 energized from the respective phases of the line-current transformers 22. The auxiliary current-transformers 28 of the timers are short-circuited by the respective back-contacts of the directional elements D. The operating windings of the timer-motors are connected in series with the make-contact 25 of the respective third-zone impedance relays Z3. These phase-fault impedance-relays Z, directional relays D, and timers T2,3 are, or may be, conventional relays which are well known in the art.

Ground-fault protection is provided by various means including a conventional residual-current or zero-phase-sequence relay IO, a more sensitive residual-current fault-detector 103, and a ground directional relay DO, each having a single make-contact which is conveniently identifiable by reference to the symbol for the relay of which it is a part. The current-coils of these three relays are energized in the neutral conductor of the line-current transformers 22, so as to be responsive to the zero-sequence current-component, thus making it possible to adjust the relays to respond to ground-fault currents which are less than the rated load-current of the line, as is common practice in residual-current ground-fault relays. The polarizing coil 29 of the ground directional relay DO may be energized in any one of different ways which are known to the art, the particular system which is illustrated in Fig. 1 utilizing current-polarization which is obtained from an auxiliary current-transformer 31 in the grounded neutral of the power-transformer 13.

In addition to the known or conventional relays just mentioned, I provide various special relays, including three ground-fault phase-selector relays SA, SB and SC, which are sensitive single-phase directional relays, each having two coils which may be designated as field-coils 32 and polarizing coils 33 respectively. Each phase-selector relay has a make-contact and a back-contact, these contacts being sufficiently identified by reference to the symbols SA, SB and SC for the respective relays. The function of the selector-relays S is to determine which is the faulted line-conductor, in the event of a single-phase line-to-ground fault, thus supplementing the operation of the ground-fault relays IO and DO, which respond only to the existence of a ground-fault without discrimination as to which phase is faulted.

To energize the respective polarizing and field-windings of the selector-relays SA, SB and SC, I make use of two different single-phase relaying-quantities, derived from a polyphase line-quantity, preferably the line-current, and having different phase-sequence components such that the phase-angles between said two single-phase relaying-quantities vary by approximately 120° in accordance with which phase-conductor is grounded. I preferably utilize, for this purpose, two of the three symmetrical phase-sequence components of the line-current, each component being substantially unmixed with any other component, as shown in the vector-representations of Figs. 3a, 3b and 3c, in which the three symmetrical components are shown for single-phase ground-faults on each of the phases, designated $\phi A$, $\phi B$ and $\phi C$, respectively.

It will be noted, from Fig. 3a, that in the event of a phase-A fault on the line, the phase-$a$ current $I_{A2}$ of the negative-sequence component is in phase with phase-$a$ current $I_{A1}$ and $I_{A0}$ of the positive and zero-sequence components. In the event of a phase-B fault, as indicated in Fig. 3b, the phase-$a$ current $I_{A2}$ of the negative-sequence component leads the positive-sequence phase-$a$ current $I_{A1}$, and lags the zero-sequence phase-$a$ current $I_{A0}$, by 120° respectively. And in the event of a phase-C ground-fault on the line, as indicated by Fig. 3c, the negative-sequence phase-$a$ current $I_{A2}$ lags the positive-sequence phase-$a$ current $I_{A1}$, and leads the zero-sequence phase-$a$ current $A_{A0}$, by 120°. If we consider, however, the phase of the negative-sequence component corresponding to the line-phase which is faulted, it will be noted that the negative and zero phase-sequence components $I_{A2}$ and $I_{A0}$, $I_{B2}$ and $I_{B0}$, and $I_{C2}$ and $I_{C0}$, respectively, are always in phase with each other, for a single-phase ground-fault on its phase, and 120° out of phase with each other for a single-phase ground-fault on any other phase. I make use of these various phase-relationships in energizing the polarizing and field-coils of my respective selector-relays SA, SB and SC.

In Fig. 1, I energize one of the two coils of each of the selector-relays SA, SB and SC from the residual or zero-sequence current of the line-current transformer-bank 22. For convenience in designation, this coil may be called the field-coil 32 of the relay, while the other relay-coil may be called the polarizing-coil or winding, although either name may be applied to either coil, the relay directionally responding to the product of the two currents flowing through its two coils, multiplied by a function of the phase-angle between said currents, after the manner of a polyphase wattmeter, as indicated by the watt-characteristic shown in Fig. 4, the response being a maximum when the two currents are in phase with each other.

In Fig. 1, I show the polarizing coils 33 of the respective selector-relays SA, SB and SC energized, respectively, from the negative-sequence phase-$a$, phase-$b$ and phase-$c$ currents $I_{A2}$, $I_{B2}$ and $I_{C2}$, as derived from a triple negative-sequence network 34, which is constructed along the principles explained in the Lenehan Patent No. 2,161,829 of June 13, 1939, in which the voltage-drop, 3R times the line-current in any phase, is combined with the voltage-drop, $jR\sqrt{3}$ times the difference between the leading and lagging line-phase currents, and utilized to obtain a negative-sequence current of a phase corresponding to the aforementioned lagging line-phase.

For example, the phase-$c$ negative-sequence component $I_{C2}$ of the line-current is obtained in conductor 35, by measuring the voltage-drops in the $jR\sqrt{3}$ reactance 36 and the 3R resistance 37. The reactance 36 has induced therein the voltage-drop in the coil 38 on the same magnetic circuit, minus the voltage-drop in the coil 39 which is also on the same magnetic circuit. The voltage-drop in the coil 38 is equal to $jRI_A\sqrt{3}$, whereas the voltage-drop in the coil 39 is equal to $jRI_C\sqrt{3}$. The 3R resistor 37 is traversed by the phase-B line-current $I_B$, as derived from the line-current transformer-bank 22, so that the voltage-drop in the resistor 37 is $3RI_B$. This produces, in the network-terminal 35, a resultant voltage-drop $6RI_{A2}$, which is proportional to the phase-$a$ negative-sequence current-component $I_{A2}$, which lags 120° behind the desired phase-$c$ component $I_{C2}$. However, the coils of the particular phase-selector relays SA, SB and SC which I utilize in Fig. 1 happen to have a 50° lagging impedance, so that, by reversing these coils and energizing them as shown, the currents traversing the coils are substantially responsive to the proper phase of the negative-sequence line-current components, even though the impressed voltages are not. Thus, in the above-mentioned example, the network-terminal 35 impresses, on the reversed SC-coil, a voltage which lags the $I_{C2}$ line-current component by (120°+180°), or leads it by 60°, and the 50° impedance of the SA-coil makes the actual relaying-current lead the ideal $I_{C2}$ by 10°, which is a tolerable error.

In the form of my invention which is shown in Fig. 1, I also utilize one other relay-means which is energized from the line-currents as derived by the current-transformers 22, and this is an insensitive ground-fault detector FD, which is less sensitive than the ground-fault tripping-relay IO. The FD fault-detector is energized in the neutral circuit of the current-transformers 22, and is provided for the purpose of affording three back-contacts which are sufficiently designated by referring to the relay-designation FD, and which are utilized as safeguards or interlocks in the three-phase fault tripping-circuits which will be subsequently described. These three FD back-contacts may be either all on the same fault-detector relay, as shown, or they may be parts of three different fault-detector relays energized with the neutral or zero-sequence current of the line-current transformers 22.

In addition to these line-current alternating-current relays, I also utilize numerous direct-current relays, and a few alternating-current voltage-responsive relays, which will be referred to in the description of the operation of my system as shown in Fig. 1.

I also utilize a carrier-current transmitter which is symbolically represented by a rectangle and a triode oscillator-valve 41; also a carrier-current receiver which is symbolically represented by a rectangle and a triode receiver-tube 42; also a polarized receiver-relay RR, having an actuating or trip-coil RRT and a restraining or holding coil RRH. The receiver relay RR has two make-contacts 43 and 44 which are utilized in the ground-fault and phase-fault tripping-circuits, respectively, as will be subsequently described.

The carrier-current transmitter and receiver are coupled to the phase-C conductor of the line 11, through a transformer 45 and a coupling-capacitor 46, and the carrier-current is kept out of the bus 12, so that it is confined to the phase-C conductor of the line 11, by means of a wave-trap 47, as is usual.

It will be understood that similar equipment is provided at the other end of the protected line-section 11.

The circuits for energizing and controlling the respective trip-coils TCA, TCB and TCC, and the respective closing-coils CCA, CCB and CCC, of the three single-pole breakers will now be described, and since the circuits are all alike except for the letters A, B and C designating the respective phases, the immediately following explanation will be applied more directly to the phase-A circuit-breaker CBA and its control-circuits, with the understanding that the other two circuit-breakers are similarly controlled by corresponding relays in their respective phases.

The TCA trip-coil is energized from the positive bus through the auxiliary breaker-contact 18, from a tripping-bus 50 which is adapted to be connected to the negative bus through various relaying circuits. The tripping-bus 50 is adapted to be energized, from the negative bus, through any one of three circuits, namely, a phase-A ground-fault circuit 51, a phase-A phase-fault circuit 52, and what may be called an all-phase circuit 53. These energizing-circuits will be referred to, in the order named.

The ground-fault branch 51 of the circuit which connects the tripping-bus 50 to the negative bus is traceable through the operating coil KA of a contactor, to a circuit 54, and thence to the SA make-contact, and then to a back-contact of a slugged, or slow-dropout, relay X3, and to a circuit 55. This relay X3 is provided with a slugged or short-circuited coil or washer 56 which gives it a delay of about ½ second in its dropout operation, in the particular installation illustrated in Fig. 1. The X3 coil is energized by being connected between the positive bus and the subsequently described conductor 58, through the subsequently described CS make-contact. From the circuit or conductor 55, the ground-fault energizing-circuit continues, through the RR contact 43, to a circuit 57, thence through the DO contact and the IO contact to the circuit 58, thence to the negative bus through the operating coil of the contactor-switch CS which is common to all three of the ground-fault tripping-circuits. The circuits 54 and 58 are also connected together through a KA make-contact, as shown. It will be noted that the circuits 55 and 58 are common to all three of the ground-fault tripping-circuits 51, in all three of the phases, as is plainly shown in both Fig. 1 and Fig. 2.

The phase-fault branch 52 of the circuit which connects the tripping-bus 50 to the negative bus, is traceable through the SA back-contact to a conductor 60 and thence through the DA make-contact to a condenser 61, thence through the Z1A contact to the conductor 62, thence through the operating coil of a contactor-switch UA to a conductor 64. From the conductor or circuit 64, connection is made to the negative bus through the operating coil of a common phase-fault master-contactor MK. The conductors 61 and 62 are also joined through two other circuits, one including the Z2A contact and the T2A contact, and the other including the Z3A contact and the T3A contact 25. The junction-point between the Z2A contact and the T2A contact is connected to a common circuit 65 which extends to the corresponding points in the other two phase-fault tripping-circuits. The conductors 65 and 64 are also joined through the make-contact 44 of the receiver-relay RR. The conductors 60 and 62 are also joined through the UA make-contact. The conductors 52 and 60 are also joined through one of the FD back-contacts, which thus shunts the SA back-contact. The conductors 52 and 64 are also joined through a circuit 52′ which includes an MK make-contact.

The so-called "all-phase" branch 53 of the tripping-circuit 50 for the phase-A trip-coil TCA connects to the negative bus through a make-contact of a contactor-switch MA.

The phase-A closing-coil CCA is energized in a circuit which extends from the positive bus, through a make-contact 66 of a closing relay XA, thence through the closing-coil CCA to a circuit 67, and thence through another make-contact 68 of the closing relay XA, to the negative bus. The XA coil is energized through a circuit which is traceable from the positive bus, through the back-contact of a cutoff relay YA, thence to the XA coil and to a circuit 69. The cutoff relay YA is provided with time-delay means, illustrated in the form of a dashpot 71, for giving it a pickup delay of a few cycles of the 60-cycle line 11. From the conductor 69, the energizing circuit of the XA coil is traceable through a back-contact of a master-switch MS, to a conductor 72, and thence through a MA back-contact 73, an RA back-contact 74, an MK back-contact 75, and a KA make-contact 76, to the conductor 54 of the ground-fault tripping-circuit 51, said conductor 54 being also connected to the phase-fault tripping-circuit 52 through the KA coil.

The RA relay is a relay of a type which remains in whichever position it occupies, even after the deenergization of the coil which caused the movement of the relay to that position. In actual practice, I prefer to make the RA relay as a toggle switch, but for convenience in illustration, it has been diagrammatically indicated as a latch-type relay having an operating coil RA which actuates the relay and a latch 77 which holds the relay in its actuated position, the latch being releasable by means of a latch-coil LA.

The conductor 69 of the XA coil is also adapted to be connected to the negative bus through two other circuits, one of said circuits being through an XA make-contact 78, and the other being through an MS make-contact 79.

The YA coil is energized from the circuit 69 through the auxiliary breaker-switch 17, and thence to the positive bus.

The RA coil is energized from the positive bus through a circuit 81, which leads through an MA back-contact 82 to the conductor 67. The circuit 81 is also connected through an MA make-contact 83 to a circuit 84 which is connected to the negative bus through the auxiliary breaker-switch 15.

The latch-coil LA is energized from the positive bus through the contact 85 of a timing relay TA, and thence to the conductor 84 which is connected to the negative bus through the auxiliary breaker-switch 15. The timer relay TA is a synchronous motor which is energized from a 115-volt alternating-current circuit which is traceable from the phase-c potential-bus 86 through the RA make-contact 87 to the circuit 88, and thence through the TA coil and the auxiliary breaker-switch 14 to the phase-b potential-bus 89.

In order to bring about a tripping operation of all three of the trip-coils TCA, TCB and TCC, I utilize three auxiliary alternating-current relays PA, PB and PC. The energizing-circuit of the PA coil is traceable from the phase-c potential-bus 86, through the RA make-contact 87, the circuit 88, the PA coil, the back-contact 91 of an auxiliary relay NA, and thence through the auxiliary breaker-switch 19 to the phase-b potential-bus 89. The auxiliary switch NA is slugged, or provided with a short-circuited coil or washer 92, so as to give it a dropout delay of 6 cycles, in the particular installation which is illustrated in Fig. 1. The NA coil is energized by being connected between the conductor 72 and the positive bus.

The PA relay has a make-contact 93 which is utilized in the energization of all three of the operating-coils of the contactor-switches MA, MB and MC, for energizing the respective all-phase tripping-circuits 53. These three relay-coils MA, MB and MC are energized in circuits which can be traced from the positive bus, through said relay-coils, to a common circuit 94, which is connected, through any one of the make-contacts 93 of the three auxiliary relays PA, PB or PC, to a common circuit 95 which, in turn, is connected to the negative bus through the auxiliary breaker-switch 16 of any one of the three single-pole circuit-breakers CBA, CBB or CBC. The common circuit 94 may also be energized from the negative bus through a tripping push-button 96, which enables the station-attendant to trip out all three poles of the circuit-breakers, at will.

The manually controlled closing of the circuit-breakers is effected by means of the master-switch MS, the operating coil of which is under the control of a closing push-button 97. An actuation of the master-switch MS effects a closing-operation by the closing of its three make-contacts 79, which energize the three closing-relays XA, XB and XC through the circuit 69 which has already been traced.

The carrier-current transmitter and the receiver-relay trip-coil RRT are controlled as follows. The make-contacts 27 of the three third-zone impedance relays Z3A, Z3B and Z3C are connected in parallel between the negative bus and a circuit 99 which is utilized to close the cathode-circuit of the transmitter-oscillator 41 through the back-contact 101 of a directionally responsive phase-fault auxiliary relay SP, and an MK back-contact 101, to a conductor 102, and thence through the back-contact 104 of a directionally responsive ground-fault auxiliary relay SG, to the cathode-terminal 105 of the transmitter-oscillator 41. A second cathode-energizing circuit is completed from the negative bus to the conductor 102 through the make-contact 106 of the sensitive ground fault carrier-starter relay 103.

The SG coil is energized from the conductor 57 in the ground-fault tripping-circuit, being connected between said conductor and the positive bus, through a resistor 107 of such magnitude that the trip-coils are not short-circuited and the CS contactor is preferably also not picked up until a ground-fault trip-circuit 51—50 is completed through one of the trip-coils TCA, TCB or TCC.

The SP coil is energized from the common conductor 65 in the phase-fault tripping circuits, being connected between this conductor and the negative bus, through a resistor 108 of such size as to prevent an actuation of any of the trip-coils TCA, TCB or TCC.

The grid-circuit 109 of the transmitter-oscillator 41 is directly connected to the negative bus, as shown, while the cathode-terminal 105 is normally held at the potential of the positive bus by being connected thereto through a resistor 111, so that the transmitter is normally in a non-transmitting condition, and transmits carrier-current only when its cathode-circuit 105 is connected to the negative bus through one of the energizing circuits which have been traced through the SG back-contact 104 and the conductor 102.

The receiver-relay trip-coil RRT is connected, through a resistance 112, between the conductor 99 and the cathode-terminal 105, the resistance 112 being large enough so that the transmitter-oscillator 41 does not oscillate except when an energizing-circuit is made through the SG break-contact 104 and the conductor 102. The two-conductors 99 and 102 are also connected through the make-contact 113 of the directionally-responsive ground-fault auxiliary relay SG.

The receiver-relay holding-coil RRH is directly energized from the receiver-tube 42, being connected between the anode-terminal 114 thereof and the positive bus.

Figure 2:
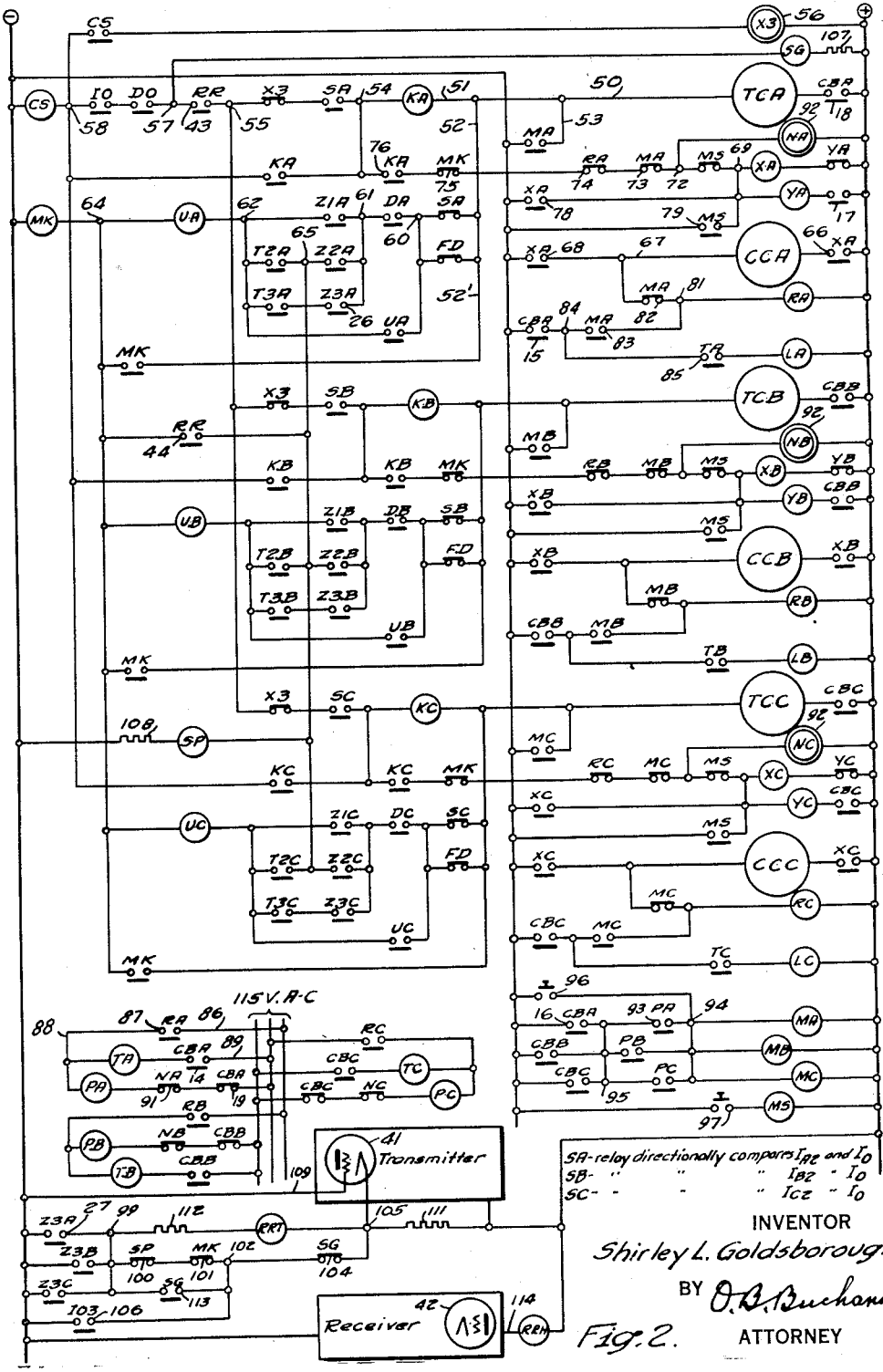
Fig. 2 is an across-the-line diagram of the relay-operation.

My improved relaying system, as shown in Figs. 1 and 2, operates by providing a separate trip-coil circuit 50 for each of the three trip-coils TCA, TCB and TCC of the three single-pole circuit-breakers CBA, CBB and CBC, respectively. In the event of a phase-to-phase fault, or a fault involving more than one line-conductor, the master-contactor MK is energized, no matter which phase, or pair of phases, is involved, so that its three make-contacts energize the phase-fault tripping-circuits 52'—52—50 for each of the three trip-coils TCA, TCB and TCC. In the event of a single ground-fault, the phase-selectors SA, SB and SC bring about the energization of only the ground-fault tripping-circuit 51—50 in the phase which was faulted, and at the same time, the contactor-switch KA, KB or KC, as the case may be, is energized, so as to pick up its make-contact 76 and energize the closing-relay XA, XB or XC, as the case may be, thus instantly energizing the appropriate closing-coil CCA, CCB or CCC, the time-constant of the closing coil being so great, however, that the affected circuit-breaker has a chance to trip, and to separate its main contacts far enough to extinguish the arc, before the circuit-breaker mechanism commences to reclose.

If the single-phase ground-fault persists on the same line-conductor after the reclosure of the single-pole circuit-breaker in that phase, the trip-coil of that breaker is again energized, and means are provided for thereupon tripping out the other two circuit breakers, without any further automatic reclosures. This operation, in more detail, is as follows, particularly with reference to some of the points which might merit further elaboration.

For a single phase-to-ground fault, carrier-current transmission is started through the sensitive IO3 contact 106, thus energizing the receiver-relay holding-coils RRH at both ends of the protected line-section. If the fault is within the range of the ground-fault tripping-relay IO, which corresponds approximately to second-zone operation, this relay picks up and closes its IO make-contact in the ground-fault tripping-circuit 51. (See Fig. 2.) If the residual current of the current-transformers at the relaying point is accompanied by an into-the-line-looking direction, the ground directional relay DO at the relaying point picks up, thus closing its DO make-contact which is the second contact in the ground-fault tripping-circuit 51. The IO and DO contacts energize the conductor 57 which energizes the auxiliary ground-directional relay SG, thus opening its back-contact 104, which does two things: it disconnects the transmitter-cathode 105 from the negative bus, thus instantly stopping carrier-current transmission at that terminal of the protected line-section, and it removes a short-circuit from around the receiver-relay trip-coil RRT at the relaying point.

If the direction of the residual current is an into-the-line-looking direction at both ends of the protected line-section, carrier will thus be removed at both ends, whereupon the receiver-relay holding-coils RRH will both be deenergized, permitting the receiver-relay trip-coils RRT to pick up the receiver-relays RR at both ends of the protected line-section. The closure of the receiver-relay contacts 43 and 44 is thus indicative of an into-the-line-looking direction at both ends of the protected line-section. The operation, thus far, results in an energization of the common conductor 55 in the ground-fault tripping circuits 51 of the respective trip-coils TA, TB and TC.

The phase-selectors SA, SB and SC take charge, from this point on, discriminating between the three line-conductors, in the event of a single line-to-ground fault, by effecting a directional comparison between two different phase-sequence components of the polyphase line-currents, as previously described in connection with the vectors shown in Figs. 3a to 3c. Only one of the three selector-relays SA, SB or SC picks up, in response to a single-phase ground-fault, thus directly energizing the appropriate trip-coil circuit, which promptly seals itself in, (as through the KA make-contact between the conductors 54 and 58), so that the trip-coil circuit is solidly maintained until the tripped current is finally broken by the opening of the auxiliary breaker-switch 18.

The energization of the ground-fault tripping-circuit 51—50, just described, energizes the common ground-fault contactor-switch CS, which picks up and energizes the auxiliary relay X3, which remains in its actuated position for a short while after the trip-circuit has been broken by the auxiliary breaker-switch 18, as a result of the action of its short-circuited washer 56. This delayed dropout of the X3 relay is for two purposes. A delayed dropout of three or four cycles is desirable, in all cases, to take care of the transient which is obtained in the negative-sequence network 34 (Fig. 1) when the single-pole breaker opens, thus safeguarding against the danger that one of the other ground-fault tripping circuits 51—50 might faultily operate as a result of a faulty response of one of the other selectors, such as SB or SC, during said transient. Such faulty operation is prevented by the open condition of the X3 back-contacts in all of the ground-fault tripping circuits 51—50 as soon as any one of said tripping-circuits is energized.

The delayed trip-out operation of the X3 relay has a second duty which is called into play only in certain protective systems in which current-polarization of the ground-directional element DO is utilized. Thus, in Fig. 6, the protected line-section 11 is connected between the power-bus 12, which is also the bus shown in Fig. 1, and a load-bus 115 at the other end of the protected line-section. This load-bus 115 is connected, not only to a step-down star-delta power-transformer 13', corresponding to the power-transformer 13 of Fig. 1, but it is also connected to a three-phase star-connected load 116.

When the phase-A breakers of the protected line-section 11 are opened, as illustrated in Fig. 6, unsymmetrical power-currents flow into the load 116, resulting in a down-flowing ground-current from the power-transformer 13', as indicated at $I_G'$, and an up-flowing ground-current $I_G$ in the other power-transformer 13. It will be observed, however, from the relay-energizing connections shown in Fig. 1, that the direction of the residual line-current, at each end of the protected line-section 11, is being compared, by the ground-directional relay DO, with the direction of the respective ground-currents $I_G$ and $I_G'$, in such manner as to give a correct directional indication in the event of an up-flowing ground-current $I_G$ in the power-transformer. During the period of time, therefore, when the unbalanced load-currents are being supplied by the sound phase-conductors, before the single-pole phase-A breakers have been reclosed at the two ends of the faulted line-conductor, the ground-directional relay DO at the end where the ground-current $I_G'$ is flowing downwardly will respond as if the outwardly flowing fault-current were flowing into the protected line-section 11, (rather than outwardly thereof), thus running the risk of a faulty operation of the single-pole breaker at one or both ends of one of the two sound phases of the line-section 11, as a result of the removal of carrier-current blocking, accompanied by a faulty response of the phase-selectors SB or SC during such conditions.

It takes about 25 cycles to reclose the breakers on the faulted line-conductor, (in the illustrated installation), and hence the auxiliary relay X3 is given a time-delay of about 30 cycles, in its dropout operation (as by means of the short-circuited washer 56), so as to provide time enough so that the breakers at the two ends of the protected line-section can reclose and reestablish a circuit for a few cycles before the X—3 back-contacts reclose.

There is a particular need for carrier-current supervision, or blocking, of the single-pole ground-fault tripping-system, in transmission systems in which quick ground-fault relaying is utilized in two successive line-sections, as will be explained in connection with Fig. 5. In Fig. 5, I have shown two successive line-sections 11 and 117, between three successive substations represented by the buses 12, 115 and 118. If we assume a single-pole breaker-operation in the line-section 117, as shown, then the single-phase power-currents which flow through the two sound line-conductors will result in a residual-current component $I_0$ which is flowing in an into-the-line-looking direction at the substation 12, and in a direction out of the line-section 11 at the substation 115, as is plainly indicated in Fig. 5. The zero-phase-sequence component $I_0$ of the single-phase power-current in phases B and C of the sound line-section 11 will have the same phase-relation to the negative-sequence component as if there were a single-phase fault on the phase-conductor A which is not carrying the single-phase power-current, which would thus result in a phase-A selector-relay response, and a faulty tripping-operation of the single-pole breaker in this phase of the sound line 11, at the station 12, where the zero-sequence current $I_0$ is flowing into the line-section, unless the carrier-current interlock 43 were utilized for interposing a break in the trip-circuit whenever the apparent fault-current is flowing in an out-of-the-line-direction at the other end of the protected section.

For all phase-to-phase, three-phase and two-phase-to-ground faults, all three poles are tripped, in the system shown in Figs. 1 and 2, and no effort is made, in this particular system, to automatically reclose. Referring to Fig. 2, it will be noted that a phase-fault will cause a response of one of the third-zone impedance-elements, such as the relay Z3A, thus energizing the transmitter cathode-circuit at 27, and starting carrier-current transmission, in the manner already described in connection with the ground-relay carrier-starting contact 106. If the phase-fault is of sufficient magnitude to pick up the second-zone impedance-relays Z2A at the two ends of the protected line-section, and if the fault-current direction is into the protected line-section at both ends thereof, the phase-fault directional relays DA will pick up at both ends of the protected line-section, thus energizing the carrier-stopping phase-fault SP relays at both ends of the protected section, the energizing-circuit of the SP relay being traceable from the negative bus, through the resistor 108, the SP coil, the conductor 65, the Z2A make-contact, the DA make-contact, and the SA back-contact to the phase-fault tripping-circuit 52—50. The energization of the two SP relays at the two ends of the protected line-section will stop carrier at both ends, thus bringing about an energization of the receiver-relay RR, closing its phase-fault tripping-contact 44, thus bypassing the resistance 108 in the SP coil-circuit, and completing a low-impedance energizing-circuit to the trip-coil TCA, resulting in a trip-coil operation, as previously described.

It will be noted that the closing of the receiver-relay contact 44 short-circuits the SP coil, which would cause a reclosure of the SP back-contact 100, and which might result in an undesirable pumping action, if it were not for the provision of the MK relay, which has its coil serially connected in the phase-fault tripping-circuit, so that it picks up and opens its back-contact 101 so as to prevent the receiver-relay tripping coil RRT from becoming short-circuited when the SP relay drops back into its deenergized position.

As soon as a phase-fault tripping-circuit 52—50 is completed, to any one of the three trip-coils, such as TCA, the phase-fault master-contactor MK is energized, so that its three make-contacts will complete a direct tripping-circuit 52' to each one of the three trip-coils TCA, TCB and TCC. This is necessary, because a phase-fault involves at least two of the three line-conductors, so that at least these two conductors must be opened, and there would in many cases be no point in leaving a single line-conductor in operation, even though there were no fault on that single line-conductor, because only a small amount of power can be transmitted over a single conductor of a three-phase circuit, even if the three-phase circuit is grounded.

It will be noted that a tripping operation, in response to the phase-fault relays Z and D, is not permitted if there is a single-phase ground-fault involving one of the two phase-conductors between which the phase-fault relays Z or D are connected. This interlocking-means, which is obtained by the SA back-contact in the phase-fault tripping-circuit just outlined, is necessary because a severe ground-fault may produce enough current to pick up the corresponding phase-fault relay, and a phase-fault tripping operation is not desirable, in such a case, because the phase-fault tripping-operation results in a tripping of all three poles in the system shown in Figs. 1 and 2, whereas it is desirable to trip only one of the poles in case the fault affects only one of the line-conductors.

It is possible, however, in the event of a fault involving two phase-conductors, that the phase-selector relays SA, SB and SC may be sufficiently sensitive so that they will respond to the apparent directions of the apparent phase-sequence current-components which result from an unbalanced condition of the current-transformers, it being well known that it is impossible to perfectly match the current-transformers, particularly under the excessive current-conditions which exist during times of faults. It is possible, therefore, for a faulty pick-up of one of the phase-selector relays SA, SB or SC to occur, in response to a phase-to-phase fault; and to safeguard against the blocking of the phase-fault tripping, in such a contingency, I have provided the shunting FD back-contacts, which are sufficiently insensitive so that they will not respond to these so-called "error" currents of the current-transformers.

In the case of a double fault-to-ground, that is, a ground-fault involving two phases or line-conductors, if my ground-fault phase-selectors SA, SB, SC are energized from the negative-sequence and zero-sequence currents, as in Figs. 1 and 2, they will select the wrong phase, but that will not matter because all three phases will be tripped out, anyway, in said system, and this three-pole switching will be brought about by the phase-fault relaying-means associated with at least one of the faulted line-conductors. Fig. 10 shows the relative phases and magnitudes of the symmetrical phase-sequence components for a double line-to-ground fault, (or for unbalanced power-transmission over only two line-conductors, for that matter), and it will be seen that a double line-to-ground fault produces a phase-coincidence of the zero-sequence components with respect to the unfaulted phase of the negative-sequence component, which means a response of the phase-selector for the unfaulted phase, which would be the SA selector, if the fault is on phases B and C. Thus, the other two ground-fault selectors, SB and SC, remain unresponsive, so that their back-contacts will not block tripping in the phase-fault tripping-circuits 52—50 for the trip-coils TCB and TCC.

The automatic reclosing of the single-pole breaker which opens in response to a single-phase ground-fault, with three-pole breaker-operation in response to a sustained single-phase fault, or in response to a phase-to-phase fault, constitutes the subject-matter of a copending application of Willard A. Derr, Serial No. 415,605, filed October 18, 1941, and assigned to the Westinghouse Electric & Manufacturing Company, for Automatic reclosing circuit breaker systems.

Briefly referring to the operation of the reclosing mechanism, it will be noted that the reclosing circuit is energized whenever any phase of the ground-fault tripping-circuits 51 is energized, such energization picking up the KA relay (assuming a phase-A fault), and closing the KA make-contact 76 which energizes the closing relay XA, as is plainly evident from Fig. 2. It will be noted, at the outset, that this XA circuit cannot be closed, in the particular system which is shown in Figs. 1 and 2, if there is a phase-fault condition on the line, because of the presence of the MK back-contact 75 in each of these circuits, that is, in each of the circuits to XA, XB and XC.

At the same time that the reclosing relay XA is energized, the cutoff relay YA is energized, and it will be noted that as soon as the YA relay responds, it will instantly interrupt the energization of the XA relay, by reason of the YA back-contact in series with the XA coil. Even though the YA relay should momentarily respond, its energization would be promptly cut off by the opening of the auxiliary breaker-contact 17, but it is usually desirable to avoid such unnecessary opening and closing of the YA back-contact, which is accomplished, in the illustrated system, by providing the YA dashpot 71 (Fig. 1) which interposes a pickup delay of a few cycles, sufficient to permit the auxiliary breaker-switch 17 to open, during the tripping-operation of the circuit-breaker.

The reclosing relay XA thus picks up, and seals itself in, through its make-contact 78, until such time as the YA back-contact finally opens, thus energizing the closing-coil CCA of the circuit-breaker. At the same time that it energizes the closing coil CCA, the XA make-contact 68 energizes the RA relay, which picks up, and latches or hold itself in its actuated position, thus opening up the initial XA closing-relay circuit at the RA back-contact 74, thus preventing a second energization of the closing-relay XA (and hence the closing-coil CCA), until such time as the latch-coil LA is energized, so as to reset the RA relay, as subsequently described.

It will be noted that, as soon as the closing-relay XA is energized, the slugged auxiliary relay NA is also energized, so that it picks up the NA back-contact 91 and interposes a break in the energizing-circuit for the alternating-current PA relay which is utilized to trip out all of the poles of the circuit-breakers.

When the self-holding relay RA is operated, and set in its operated position, it closes an RA make-contact 87 in an energizing partial-circuit for the timer TA, and also a partial-circuit for the aforementioned auxiliary relay PA; but the timer TA is not immediately energized because the circuit-breaker has opened far enough to open its front-contact 14; and the PA relay is not immediately energized because of the open NA back-contact 91.

The circuit-breaker is now reclosing, and when the breaker-mechanism is in its closed position, the auxiliary breaker-switch 17 closes, energizing the cutoff relay YA, which, in a very few cycles, picks up and deenergizes the closing relay XA, thus interrupting the current flowing through the closing-coil CCA. The deenergization of the XA relay opens the XA make-contact 78 and deenergizes the NA relay which drops out, not immediately, but after about six cycles, or long enough to be sure that the auxiliary back-contact 19 of the circuit-breaker has opened, again, on the closing-stroke of circuit-breaker. When the NA relay drops out, it closes its NA back-contact 91 in the circuit of the PA coil. The PA coil is not energized, since the auxiliary breaker-switch 19 is now open at the completion of the closing stroke of the circuit-breaker.

In case the single ground-fault should be persisting on the line, resulting in the immediate retripping of the single-pole breaker after it had been once closed, it will be noted that the closing relay, such as XA, will not again be energized, because of the presence of the block, or open-circuit, at the open RA back-contact 74, which is now set in its open position.

As soon as the breaker (such as CBA) opens this second time, it closes its back-contact 19, which is in the energizing-circuit of the coil of the PA-relay, and if the timer TA has not yet moved to contact-making position, this PA-coil circuit will be completed through the RA make-contact 87, so that the PA relay will be energized, picking up its make-contact 93. If now, any of the circuit breakers CBA, CBB or CBC is closed, in this case the breakers CBB and CBC, the make-contacts 16 of these closed breakers will be closed, thus energizing the three contactor-switches MA, MB and MC, and through them energizing the three all-phase trip-circuits 53 for all three of the trip-coils TCA, TCB and TCC of the three circuit-breakers, resulting, however, in the energization of only the closed breakers (such as CBB and CBC) which have their auxiliary trip-circuit switches 18 closed at the moment.

Usually, however, a single-phase ground-fault is self-clearing, so that, when the breaker is reclosed, it will not immediately trip out again. Under these circumstances, the timer TA is set in operation, through its circuit which includes the RA make-contact 87 and the circuit-breaker make-contact 14. At the end of a predetermined time, which may be anything from 5 seconds to 20 or 30 seconds, more or less, or sufficient time to make sure that the grounding arc or fault is not going to restrike again, the timer TA closes its contact 85 in series with the LA coil; and if the breaker is still closed, as determined by a closed position of the auxiliary breaker-switch 15, the TA timer-contact 85 energizes the latch-coil LA, which restores the RA relay to its initial, non-actuated position, thus deenergizing the TA timer, and setting the apparatus ready for a new operation, the next time a fault occurs on the system.

The SG make-contact 113, which I have provided in shunt-circuit relation to the SP break-contact 100 and the MK break-contact 101, is for the purpose of making sure that the receiver-relay trip-coil RRT is energized, as soon as the SG break-contact 104 opens in response to an into-the-line-looking direction of the ground-fault current, in the remote contingency that the SP relay might be operated (thus opening its back-contact 100) at a time when none of the third-zone impedance-relay contacts 27 is closed. The SG make-contact 113 makes it possible for the receiver-relay trip-coil RRT to thereby energize from the negative bus, through the 103 make-contact 106, the conductor 102, the SG make-contact 113, the conductor 99, the resistor 112, the RRT coil, the conductor 105, and the resistor 111, to the positive bus.

While I have thus far described my preferred form of invention in a particular kind of single-pole-tripping relaying-system utilizing carrier, and in a particular kind of carrier-current relaying-system utilizing single-pole tripping and reclosure of separate single-pole breakers, it should be understood that either the single-pole improvements or carrier-system improvements include features of general utility apart from the other. While various features of my carrier system are designed for, and particularly adapted to cooperate with, my particular single-pole circuit-breaker control, as above described, it should also be noted that certain novel features of the carrier system are useful in other carrier systems which do not involve single-pole tripping. In like manner, while my improved single-pole relaying system, utilizing directional phase-sequence-comparing phase-selectors SA, SB and SC, checked by conventional residual-current default-detector and/or ground-directional elements, finds its fullest scope in connection with the illustrated reclosing system, and with the illustrated carrier-current system, or with equivalents or modifications of these illustrated systems, my single-pole system is quite useful alone, particularly in transmission systems in which quick ground-fault relaying and tripping is not required in an adjoining section of the system.

I wish my illustrations of the various components of the protective system shown in Fig. 1 to be understood, therefore, as representative of principles, as well as showing a preferred form of embodiment. Thus, while I have shown a reclosing system which permits only one reclosure of a tripped circuit-breaker before blocking further reclosures and tripping out all three poles, it should be well understood that simple operation-counters could be introduced to permit any desired number of reclosures, as is well known in the reclosing-breaker art.

Also, while I have shown a ground-fault phase-selector system in which the negative-sequence coil of each phase-selector is supplied with its own phase of the negative-sequence current-components,—to be compared, in direction, with the zero-sequence component,—other directional comparisons of phase-sequence quantities are also available, as discussed in connection with the vectors of Figs. 3a to 3c.

Figure 9:
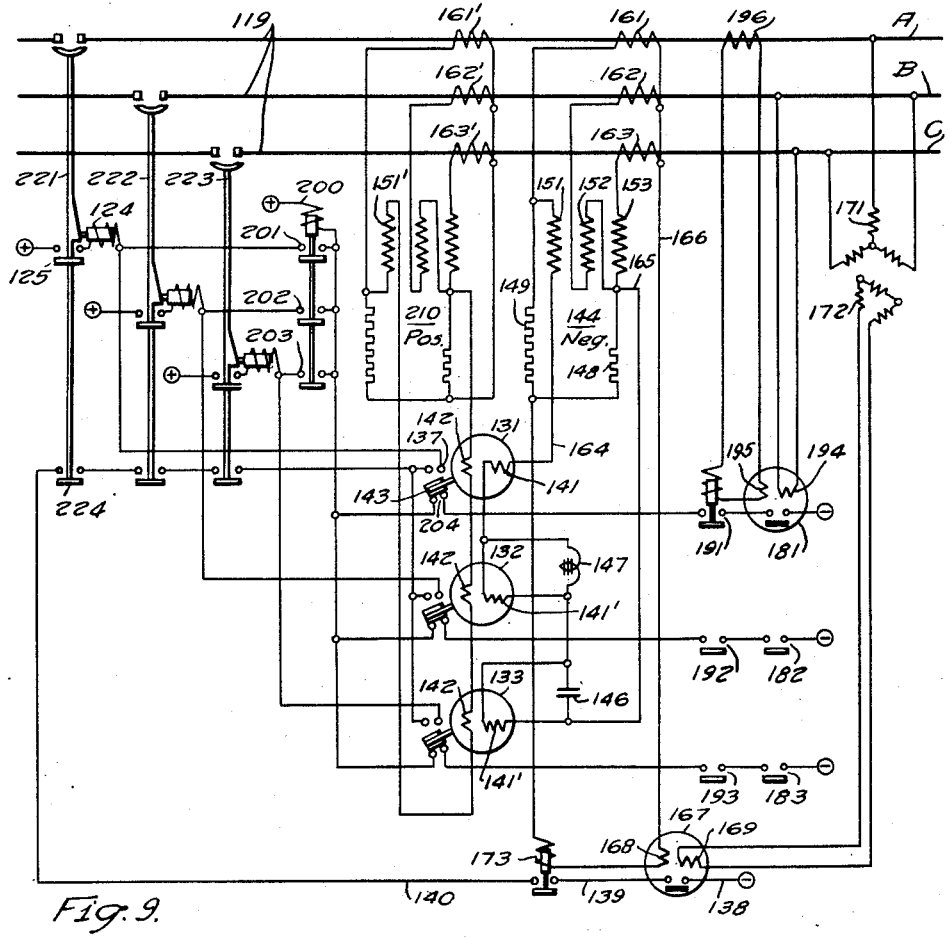
Fig. 9 is a view similar to Fig. 7, showing a modified form of the connections and interlocks for the three ground-fault phase-selector relays.

Thus, in Figs. 7 and 9, I have shown two simple embodiments of just the fault-responsive-relaying part of my invention, with different alternative methods of energizing the two coils of the phase-selector relays and interlocking the selector-contacts with other protective contacts.

Fig. 7 shows an electrical system 119 associated with a source of supply 120. The system 119 may take many forms, but, as illustrated, the system comprises a three-phase transmission circuit having three phase-conductors A, B and C. Electrical energy is supplied to the transmission circuit 119 from the source 120, which may be a three-phase alternating-current generator having a grounded neutral. The operating frequency of the source 120 may have any desired value, but for the purpose of illustration it may be assumed that the source 120 is a 60-cycle alternating-current generator.

Each of the phase-conductors of the transmission circuit 119 is connected to the generator 120 through an independent single-pole switch or circuit-breaker 121, 122 or 123. Each of the circuit-breakers is provided with an independent tripping-solenoid 124. For assuring deenergization of each tripping-solenoid when the associated circuit-breaker is open, each circuit-breaker is provided with a pallet switch 125 having front-contacts connected in the energizing circuit for the associated tripping-solenoid.

In order to control the tripping of each circuit-breaker 121, 122 and 123 in accordance with the condition of its associated phase-conductor, three selector-relays 131, 132 and 133 are associated with the tripping-solenoids of the respective circuit-breakers. Each of the selector-relays includes a pair of tripping contacts 137 which, when closed, connect the associated tripping-solenoid for energization from a direct-current source represented by the plus and minus signs (+) and (—). For example, when the phase-A selector-relay 131 closes its contacts 137, a circuit is established for the tripping-solenoid 124 of the phase-A circuit-breaker 121; which may be traced from the negative bus through conductors 138, 139 and 140, the contacts 137 of the selector-relay 131, the tripping-solenoid 124, and the pallet-switch 125 of the circuit-breaker 121, to the positive bus. Similarly, when the phase-B selector-relay 132 closes its contacts 137, a tripping-circuit is established for the tripping-solenoid 124 of the phase-B breaker 122. In an analogous manner, closure of the contacts 137 of the phase-C selector-relay 133 establishes an energizing-circuit for the tripping-solenoid 124 of the phase-C breaker 123.

From the disposition of the selector-relays 131, 132 and 133, it will be noted that operation of each selector-relay is desired only when a fault occurs on the associated one of the phase-conductors A, B and C. The construction and energization of the selector-relays which assure such selective operation will be understood more clearly from a consideration of the vector-relationships illustrated in Figs. 3a to 3c, which have already been described.

The construction of the selector-relays 131, 132 and 133 may vary appreciably, but for the purpose of illustration each of the relays is provided with a polarizing winding 141 and a field-winding 142. These relays may be of the induction type wherein the windings 141 and 142 cooperate, when properly energized, to produce a shifting magnetic field, after the manner of a polyphase wattmeter. An electro-conductive armature (not shown) is positioned within the magnetic field to rotate the movable contact 143 of each relay from the position illustrated in Fig. 7 to a position in contact with the tripping contacts 137.

As well understood in the art, the selector-relays 131, 132 and 133 may be designed to respond to different phase-relationships between currents passing through their respective windings 141 and 142. By proper selection of the phase-sequence current-components for energizing the respective windings 141 and 142 of the selector-relays 131, 132 and 133, proper selective tripping of the circuit-breakers 121, 122 and 123 is accomplished solely by dependence upon phase-relationships rather than on current-magnitudes. Consequently, sensitive tripping of the circuit-breakers can be provided.

Phase-sequence filters for providing the desired phase-sequence components are well known in the art, an example of a suitable filter being disclosed in the previously mentioned Lenehan Patent No. 2,161,829. It should be noted that if the simple filter as shown in the Lenehan patent is designed to produce an output corresponding to one vector, for example, the phase-$a$ vector of one of the sequences such as a negative-phase-sequence, the output always will correspond to the phase-$a$ vector, regardless of the phase-position thereof. Consequently, for the three fault-to-ground cases herein discussed, as shown in Figs. 3$a$, 3$b$ and 3$c$, the output of such a simple negative-phase-sequence filter will vary in phase in accordance with the positions of the phase-$a$ negative-sequence vectors illustrated in Figs. 3$a$, 3$b$ and 3$c$.

In the simplified system shown in Fig. 7, I employ a single simple negative-sequence filter 144, and I provide the necessary discrimination between the various phase-relationships by adjustments of the several selector-relays 131, 132 and 133. To this end, the three polarizing windings 141 of the selector-relays may be connected in parallel or series, but preferably in series as illustrated, for energization in accordance with the phase-$a$ vector of the negative-phase-sequence current $I_{2A}$ flowing in the transmission circuit 119. In an analogous manner, the three field-windings 142 are connected in parallel, or preferably in series as illustrated, for energization in accordance with the zero-phase-sequence current flowing in the transmission circuit 119.

In order to discriminate between the various phase-relationships, the zero-torque lines 145 of the respective selector-relays 131, 132 and 133 are adjusted in accordance with the watt-characteristics shown in Figs. 8$a$, 8$b$ and 8$c$, respectively. The areas of these charts within which the selector-relay responds, so that its tripping-contacts 137 remain closed, and the areas within which the relay holds back, so that its tripping contacts 137 remain open, are indicated clearly on the respective charts in Figs. 8$a$ to 8$c$. The indicated watt-characteristics shown in Figs. 8$b$ and 8$c$ may be obtained, in the phase-B and phase-C selector-relays 132 and 133 of Fig. 7, by increasing the number of turns of the polarizing windings 141' of these relays, reversing them, and shunting them with a capacitor 146 and an inductor 147, respectively. The shunting capacitor 146, for example, causes the polarizing relay-current in the phase-B selector-relay 132 to lag 60° behind the negative-sequence line-current component $I_{2A}$ which is delivered by the negative-sequence network 144; and hence the reversal of the polarizing-winding terminals gives the effect of a polarizing current which leads the $I_{2A}$ current by 120°, in the phase-B selector-relay 132, bringing this polarizing current into phase with the phase-$b$ negative-sequence component, as will be seen upon reference to any one of Figs. 3$a$, 3$b$ or 3$c$.

If a single-phase ground-fault should occur on phase-A, as indicated in the phase-relations shown in Fig. 3$a$, the phase-$a$ negative and zero-sequence currents, when applied to the phase-A selector-relay 131, energize the relay to close its tripping-contacts 137. Such closure results in the tripping of the phase-A circuit-breaker 121. When the same currents are applied to the phase-B selector-relay 132, it will be noted, from the chart in Fig. 8$b$, that the zero-sequence current passing through the field-winding falls in the non-responsive area of the chart. That is, the negative and zero-sequence phase-$a$ currents of Fig. 3$a$ are in phase with each other, and consequently both currents coincide with the vector $I_{2A}$ of the watt-characteristic chart in Fig. 8$b$. For this reason, the phase-B selector-relay 132 fails to operate, and its tripping-contacts 137 remain open. Similarly, the phase-C selector-relay 133, which has a watt-characteristic represented by the chart in Fig. 8$c$, remains non-responsive. In this case again, both of the energizing currents of the relay coincide with the vector $I_{2A}$, and consequently fall within the non-responsive area of the chart in Fig. 8$c$. From this analysis, it will be apparent that, when a ground-fault occurs on the phase-conductor A, only the phase-A circuit-breaker 121 in Fig. 7 is tripped.

Let it be assumed, next, that a fault-to-ground occurs on the phase-conductor B. Under these circumstances, the phase-$a$ vector of the negative-phase-sequence current and the phase-$a$ vector of the zero-phase-sequence current occupy the positions illustrated in Fig. 3$b$, the zero-phase-sequence current-vector leading the negative-phase-sequence current-vector by 120°. With reference to the phase-A selector-relay 131, which has a watt-characteristic similar to that represented by the chart in Fig. 8$a$, it will be noted that the phase-$a$ zero-phase-sequence current leads the vector $I_{2A}$ (which represents the negative-sequence phase-$a$ vector in the chart) by 120°, and consequently falls within the non-responsive area of the chart. Consequently, the phase-A selector-relay 131 fails to close its tripping-contacts 137. Proceeding next to the phase-B selector-relay 132, having a watt-characteristic represented by the chart in Fig. 8$b$, it will be noted that the phase-$a$ vector of the zero-phase-sequence current leads the vector $I_{2A}$ of the chart by 120°, and falls squarely in the middle, or maximum torque point, of the responsive area of the chart, Fig. 8$b$. Consequently, this phase-B selector-relay 132 operates, closing its tripping-contacts 137 and tripping the phase-B circuit-breaker 122. With reference to the phase-C selector-relay 133, represented by the chart in Fig. 8$c$, it will be noted that the phase-$a$ vector of the zero-phase-sequence current leads the vector $I_{2A}$ of the chart by 120°, and consequently falls within the non-responsive area of the chart. Therefore, this phase-C selector-relay 133 fails to close its tripping-contacts 137. For a fault-to-ground occurring on the phase-conductor B, therefore, only the phase-B selector-relay 132 operates, to trip the phase-B circuit-breaker 122.

By a similar analysis, it will be found that, when a fault occurs on the phase-conductor C, only the phase-C selector-relay 133 closes its tripping-contacts, to trip the phase-C circuit-breaker 123. From this analysis, it will be observed that proper selection of the circuit-breakers is obtained, despite the common energization of all of the selector-relays 131, 132 and 133 from the same current-source.

It will be understood that each of the circuit-breakers 121, 122 and 123 in Fig. 7 may include either conventional reclosing mechanism or the special reclosing mechanism which I have shown in my preferred form of embodiment in Fig. 1. Such reclosing mechanism may reclose each circuit-breaker, after a tripping-operation thereof, a predetermined number of times, followed by lockout of the circuit-breaker if the fault responsible for the tripping-operation fails to clear during one of the reclosures thereof.

The selector-relays, SA, SB and SC of Fig. 1, or 131, 132 and 133 of Fig. 7, have adequate sensitivity for practically all applications. A consideration of the production of the phase-sequence quantities will show that, on a phase-to-ground fault, the negative-phase-sequence current equals the zero-phase-sequence current in magnitude. This means that, on a phase-to-ground fault, sufficient energy for actuating the selector-relays practically always will be present. Moreover, the production of these phase-sequence quantities is substantially independent of circuit-characteristics and system-conditions. For example, the magnitude of the load-currents flowing in the circuit 11 or 119 has substantially no influence on the negative and zero-phase sequence currents produced by a fault-to-ground.

Energization of the selector-relays may be derived from the circuit 119 (Fig. 7) in any desired manner. Preferably, the energization is derived from a phase-sequence current-filter or network 144 of the type disclosed in the aforesaid Lenehan patent. Briefly such a filter may include two resistors 148 and 149, associated with a secondary winding 151 which is inductively coupled to two primary windings 152 and 153. The filter may be energized from three current-transformers 161, 162 and 163, which are associated, respectively, with the phase-conductors of the circuit or line 119. If the resistor 148 has a resistance of R, the resistor 149 should have a resistance of 2R, and the mutual inductance between each primary winding 152 or 153 and the secondary winding 151 should be equal to $j\sqrt{3R}$. With the parts proportioned as stated, and with the connections of the filter 144 as illustrated in Fig. 7, the output-conductors 164 and 165 of the filter carry a current proportional to the phase-$a$ vector of the negative-phase-sequence current flowing in the circuit 119. By inspection of Fig. 7, it will be noted that the polarizing windings 141 and 141' of the three selector-relays are connected in series across the conductors 164 and 165. Consequently, these polarizing windings will be energized in accordance with the desired negative-phase-sequence current quantity.

It will be observed, further, that the three line-current transformers 161, 162 and 163 are connected in star, and that the neutral of this star-connection is connected to a neutral conductor 166. For this reason, the neutral conductor 166 carries a current proportional to the zero-phase-sequence current present in the circuit 119. Since the field-windings 142 of the selector-relays are connected in series with the neutral conductor 166, they will be energized in accordance with the zero-phase-sequence current present in the circuit 119. Further details concerning the current-filter may be obtained by reference to the aforesaid Lenehan patent.

Since the selector-relays, SA, SB and SC, or 131, 132 and 133, are energized by zero and negative-phase-sequence currents, these relays operate, regardless of the direction of power-flow in the circuit 11 or 119. Since it is generally desirable that the circuit-breakers be tripped only when the fault-current flows away from the generator 120, or, in general, away from the relaying station, a suitable directional element may be provided for restricting tripping of the circuit-breakers to the conditions accompanying current-flow away from the generator 120. This directional relay may take the form of an induction-type ground-directional relay 167 (Fig. 7), having a current-winding 168 and a voltage-winding 169. As is well understood in the art, when these windings are suitably energized, a shifting magnetic field is produced, which actuates an electro-conductive armature (not shown) to close the relay-contacts.

In the specific embodiment illustrated in Fig. 7, the ground-directional relay 167 is energized in accordance with the zero-phase-sequence current in the circuit 119. To this end, the current-winding 168 is included in series with the field-windings 142 in the neutral conductor 166, for energization in accordance with the zero-phase-sequence current in the circuit 119.

The voltage-winding 169 of the ground-directional relay 167 is energized in any suitable manner, such as in accordance with the zero-phase-sequence voltage in the circuit 119. For example, a potential-transformer having a grounded-neutral, star-connected primary winding 171 and an open-delta secondary winding 172 is connected for energization from the circuit 119. The voltage-winding 169 of the directional relay 167 is included in the delta-circuit of the secondary winding 172. As is well understood in the art, the current flowing in the delta-winding 172 and in the voltage-winding 169 is proportional to the zero-phase-sequence voltage in the circuit 119. Since the windings 168 and 169 are energized respectively by zero-phase-sequence current and zero-phase-sequence voltage, it follows that the relay 167 responds to the zero-phase-sequence power or current-direction in the circuit 119; and it is a conventional residual-current directional relay such as has been heretofore employed for protecting electrical circuits.

Although the directional relay 167 alone suffices to provide a directional control for the selector-relays 131, 132 and 133, nevertheless, in practice, it is generally desirable to provide an auxiliary residual-current relay 173, which is responsive to the zero-phase-sequence current present in the circuit 119. As shown in Fig. 7, the auxiliary relay 173 may have its energizing winding included in series with the field-windings 142 of the selector-relays and the current-winding 168 of the directional relay. The auxiliary relay 173 may be designed to close its make-contacts when zero-phase-sequence current above a predetermined minimum value flows in the circuit 119. If desired, this auxiliary relay may include an adjustment for varying the current-value to which it responds.

By reference to Fig. 7, it will be noted that the contacts of the ground-directional relay 167 and the contacts of the auxiliary ground-current relay 173 are included in the conductors 138, 139 and 140 through which tripping-current is supplied, for energizing the respective tripping-solenoids 124 under the control of the several selector-relay contacts 137. If the directional relay 167 is adjusted to close its contacts only when zero-sequence power flows in the circuit 119 away from the generator 120, it follows that a closure of the contact 137 of any selector-relay is effective to trip its single-pole circuit-breaker only when said zero-sequence power flows in said direction.

If one of the circuit-breakers, such as the phase-A circuit breaker 121, trips, power or load-current continues to flow from the generator 120 over the two sound phase-conductors associated with the remaining circuit-breakers, in this case the phase-conductors B and C. It will be observed that such a condition results in an unbalanced operation of the electrical system. Some question may arise as to the effect of this unbalance on the selector-relays 132 and 133 which are associated with the sound phase-conductors. A discussion of the effects of such unbalance will assist in an understanding of the invention.

Assuming, first, that the generator 120 is supplying energy to an ungrounded load or receiver-end, the currents flowing in the sound phase-conductors B and C are equal in magnitude, and displaced 180° in phase. For this reason, no zero-phase-sequence current is present in the circuit 119. Since no zero-phase-sequence current is present, no operation of the residual-current ground-fault detector-relay 173 results. Unless the error-current of the current-transformers 161—162—163 is too great, it also follows that there will be no operation of the relatively sensitive directional elements, either the selector-relays 131, 132 and 133, or the ground-directional relay 167, under these unbalanced load-conditions. Therefore, the generator 120 continues to supply single-phase energy over the two sound phase-conductors B and C.

If, however, the load or receiving-end is grounded, the currents flowing in the two sound phase-conductors B and C are substantially equal, and displaced in phase by 120°, as illustrated in Fig. 10, from which it will be noted that the phase-a vector-components of the negative-phase-sequence current and the zero-phase-sequence current are in phase. For this phase-relationship of the negative and zero-phase-sequence currents, only the phase-A selector-relay 131 (Fig. 7) operates, to close its tripping-contacts 137. Since this selector-relay 131 has already operated, to trip the phase-A circuit-breaker 121, further operation of this selector-relay has no further effect upon the operation of the electrical system. The tripping-contacts 137 of the other two phase-selector relays 132 and 133 remain open, to permit continued transmission of power over the sound phase-conductors B and C.

On a phase-to-phase-to-ground fault, the fault-currents traversing the faulty phase-conductors will generally be unequal, and displaced in phase by less than 180°. For example, let it be assumed that a fault-to-ground occurs on each of the phase-conductors B and C. Since the line currents flowing through only two of the line-conductors are generally unequal, and less than 180° displaced in phase, it follows that the zero and negative-phase-sequence currents derived from the filter usually will not be in phase. If these phase-sequence currents are displaced less than 30° in phase, only the phase-A selector-relay 131 operates, to trip the phase-A circuit-breaker 121. It will be noted that the result of such tripping is to remove, from service, the phase-conductor A which is in a sound condition. However, phase-fault relays are generally provided, in addition to the selector-relays, and these phase-fault relays will operate to trip the remaining circuit-breakers, anyway. As previously pointed out, the removal of two phase-conductors from service permits, at best, the passage of only a very small amount of power over the remaining phase-conductor, and consequently, for faults on two phase-conductors, it is sometimes satisfactory, and even preferable, to remove all three phase-conductors from service.

If the aforesaid phase-sequence currents differ in phase by more than 30° but less than 90°, then the phase-A selector-relay 131, and one of the two remaining selector-relays 132 or 133, will be actuated, so that two of the single-pole circuit-breakers will be tripped by the phase-selector relays. Since the disconnection of at least two of the phase-conductors is always desired under such circumstances, and since adequate protection is usually also afforded by the phase-fault-relays which are generally provided, the system operates satisfactorily on phase-to-phase-to-ground faults. In other words, since the phase-relays assure tripping of all three circuit-breakers, on a phase-to-phase-to-ground fault, the operation of my selector-relays is immaterial.

As shown by way of illustration in the simplified, and somewhat diagrammatic, form of my invention in Fig. 7, the phase-relays may take the form of induction-type directional-relays 181, 182 and 183. These directional relays are similar, in construction, to the ground-directional relay 167. Although the directional phase-relays 181, 182 and 183 may be employed alone, it is generally desirable, in practice, to provide auxiliary phase-fault-detector relays 191, 192 and 193, which may be similar, in construction, to the auxiliary ground-fault-detector relay 173. Each of the directional phase-relays, and its associated phase-fault-detector relay, are connected for energization from a separate phase-conductor of the line. For example, the directional phase-relay 181 may have its voltage-winding connected across the phase-conductors B and C, but, for simplicity, said relay is shown with its voltage-winding 194 connected for energization from the phase-conductor A. Adjustment of the relay for either connection is understood in the art. The current-winding 195 of the directional phase-relay 181, and the energizing winding of the auxiliary phase-fault-detector relay 191, are connected in series, for energization from a current-transformer 196 associated with the phase-conductor A. When the current flowing in the phase-conductor A is in the proper direction and has a sufficient magnitude, the contacts of the relays 181 and 191 close. In a similar manner, the relays 182 and 192 are connected for energization from the phase-conductor B and the relays 183 and 193 are connected for energization from the phase-conductor C. In order to simplify Fig. 7, the energizing-connections for the last four relays have been omitted.

From the foregoing discussion, it will be recalled that an operation of any directional phase-relay and its associated auxiliary phase-fault-detector relay should trip all three of the circuit-breakers 121, 122 and 123. Such tripping may be effected through a gang-relay 200, having three sets of contacts, 201, 202 and 203, for controlling the energization of the respective tripping solenoids 124 of the three single-pole breakers 121, 122 and 123. The contacts of the directional and fault-detector phase-fault relays for each phase-conductor may be connected in parallel with the corresponding contacts for each of the remaining phase-conductors, for energizing the winding of the gang-relay 200. With such an arrangement, the passage of current through any phase-conductor, such as the phase-conductor A, in the proper direction and magnitude, actuates the associated directional phase-relay 181 and the auxiliary phase-fault-detector relay 191, to energize the gang-relay 200. Actuation of the gang-relay 200 results in tripping all three of the circuit-breakers 121, 122 and 123.

Although the relay-system thus far described in connection with Fig. 7 is adequate for certain installations, under some circumstances the phase and selector-relays may interfere. For example, if a solid, or very severe, ground-fault should occur on the phase-conductor A, the current flowing through said phase-conductor may suffice not only to actuate the selector-relay 131, but also to actuate the directional phase-relay 181 and the auxiliary phase-fault-detector relay 191, which would result in tripping all three circuit-breakers, despite the fact that a tripping of only the phase-A circuit-breaker 121 was desired. In order to avoid this interference, each directional phase-relay or its auxiliary phase-fault-detector relay, or both of said relays, may be provided with a time-delay greater than the time-delay of the associated selector-relay. This would permit the operation of a selector-relay to trip a single circuit-breaker, clearing the fault (if it involved a single line-conductor), before the associated phase-relays could operate and trip all three circuit-breakers.

However, Fig. 7 shows a more positive system for preventing interference between the selector and phase-relays. Referring to Fig. 7, it will be noted that each selector-relay has a pair of back-contacts 204, and these back-contacts are respectively connected in series with the contacts of the associated phase-relays. In order to energize the gang-relay 200, not only must a directional phase-relay and its auxiliary phase-fault-detector relay be actuated, but the back-contacts 204 of the associated selector-relay also must remain closed. An energizing-circuit for the gang-relay 200 may be traced from the negative bus through the contacts of the directional phase-relay 181, the contacts of the auxiliary phase-fault-detector relay 191, and the back-contacts 204 of the selector-relay 131, to the energizing-winding of the gang-relay 200, and thence to the positive bus. An actuation of the gang-relay, as above noted, establishes energizing circuits for all three of the tripping solenoids 124.

From the foregoing description, it is believed that the operation of the system illustrated in Fig. 7 will be clear. If a ground-fault occurs on one of the phase-conductors, such as the phase-conductor A, the associated selector-relay 131 operates to close its contacts 137, establishing an energizing-circuit for the tripping-solenoid 124 of the phase-A circuit-breaker 121. Therefore, the generator 120 continues to supply power over the two sound phase-conductors B and C. If the ground-fault on the phase-conductor A results in the flow of an exceptionally heavy current, the directional phase-relay 181 and the auxiliary phase-fault relay 191 may also close their contacts, but the prior operation of the selector relay 131 has opened its back-contacts 204, so that the gang-relay 200 is not energized. Therefore, the phase-B and phase-C circuit-breakers 122 and 123 remain closed.

If a phase-to-phase fault occurs on the circuit 119, no zero-phase-sequence current flows therein, but one or more pairs of the phase-relays operate to energize the gang-relay 200, tripping all three circuit-breakers 121, 122 and 123.

Finally, if a two-phase-to-ground fault occurs on the circuit 119, such a fault, as previously noted, results in the operation of either one or two of the selector-relays. For example, if the phase-to-phase-to-ground involves the phase-conductors B and C, only the phase-selector relay 131 may operate, or one of the other phase-selector relays 132 or 133 may also operate. However, since fault-current flows in both of the phase-conductors B and C under such conditions, the phase-relays which are associated with at least one selector-relay having its back-contacts closed will operate, to energize the gang-relay 200, tripping all three circuit-breakers.

In certain systems, negative and zero-phase-sequence currents may not be available for energizing the selector-relays. For example, an ungrounded source of power may supply energy over a transmission-circuit to a grounded-neutral, star-connected primary winding of a grounding-transformer having a delta-connected secondary winding. Such star-delta grounding-transformers are well known in the art. If no other source of power is provided at the grounding bank, only positive and negative-sequence currents can flow in the transmission circuit adjacent to said source of power. Consequently, in such a system, negative and zero-phase-sequence currents are not available for energizing selector-relays.

As previously explained, however, the selector-relays may be energized by positive and negative-phase-sequence currents. A system employing such energization is illustrated in Fig. 9.

In Fig. 9, many of the parts illustrated are similar to the parts already described for Fig. 7. Consequently, the description of Fig. 9 may be restricted to the parts which differ from Fig. 7.

The field-windings 142 of the selector-relays in Fig. 9 are energized, in any suitable manner, in accordance with the positive-phase-sequence current flowing in the circuit 119. As illustrated in Fig. 9, these field-windings 142 are energized from a positive-phase-sequence current-filter 210, which may be of the type illustrated in the aforesaid Lenehan patent. In the specific embodiment illustrated in Fig. 9, the positive-phase-sequence current-filter 210 is similar to the negative-phase-sequence current-filter 144, except for the reversal, in connections, of the secondary winding 151'. With the connections as illustrated, the filter 210 delivers current proportional to the positive-phase-sequence current in the circuit 119, and this current is supplied to the field-windings 142.

From an inspection of Fig. 3a, it will be noted that, for a single-phase ground-fault on the phase-conductor A, the phase-a vectors of the positive and negative sequences are in the same phase-relationship as the phase-a vectors of the negative and zero phase-sequences. Consequently, the phase-selector relay 131 may be adjusted to have the watt-characteristic illustrated in the chart in Fig. 8a.

Referring to Fig. 3b, it will be noted that, for a fault on the phase-conductor B, the phase-a vector of the positive-phase-sequence current lags the phase-a vector of the negative-phase-sequence current by 120°, whereas the phase-a vector of the zero-phase-sequence current leads the phase-a vector of the negative-phase-sequence current by 120°. Consequently, in order to properly respond to the positive and negative-phase-sequence current-relationships resulting from a fault on the phase-conductor B, the phase-B selector-relay 132 is adjusted to have a watt-characteristic similar to that represented in the chart in Fig. 8c, which may be done by means of the inductance 147 previously described.

Figure 8A:
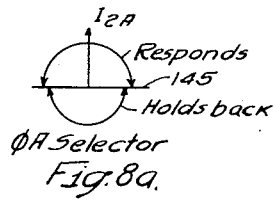
Figs. 8a, 8b and 8c are vector-charts showing the watt-characteristics of the three ground-fault phase-selector relays which are utilized in the system shown in Fig. 7.
Figure 8B:
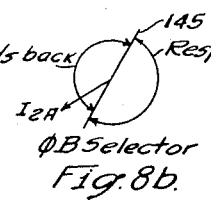

By analogous reasoning, the phase-C selector-relay 133 of Fig. 9 may be adjusted to have a watt-characteristic similar to that represented by the chart in Fig. 8b.

With these modifications, the performance of the system thus far described for Fig. 9 is similar to the performance of the system illustrated in Fig. 7. However, it should be noted that the positive-phase-sequence current is somewhat affected by the load-current. Consequently, in certain cases, some further modification of the watt-characteristics of the selector-relays may be desirable, as determined by local conditions.

It will be recalled that when any one of the circuit-breakers trips, the resulting supply of power over the two sound phase-conductors is accompanied by some unbalance. Although the phase-sequence currents resulting from such unbalance were shown to have no undesirable effect on the selector-relays of Fig. 7, it may be desirable to provide a more positive guarantee against the effects of such unbalance in Fig. 9. To this end, the system illustrated in Fig. 9 is modified to render the selector-relays ineffective after the tripping of any one of the circuit-breakers.

Fig. 9 shows three circuit-breakers 221, 222 and 223, which correspond to the circuit breakers 121, 122 and 123. The only difference resides in the provision of an additional pallet-switch 224 on each circuit-breaker. These added pallet-switches 224 have front-contacts which are all connected in series, to control the energization of the tripping-solenoids 124 through the contacts 137 of the several selector-relays 131, 132 and 133. For example, the circuit for energizing the tripping-solenoid 124 of the phase-A breaker 221 may be traced from the negative bus, through the contacts of the ground-directional relay 167, the contacts of the auxiliary ground-detector relay 173, the conductor 140, the front-contacts of the three pallet-switches 224, and the front-contacts 137 of the phase-A selector-relay 131, to the tripping-solenoid 124 of the phase-A circuit-breaker 221, and thence through the pallet-switch 125 to the positive bus.

When any one of the circuit-breakers 221, 222 or 223 trips, the associated pallet-switch 224 opens its contacts, preventing further tripping of the remaining circuit-breakers through the front-contacts 137 of the other selector-relays. Consequently, actuation of any selector-relay by the unbalance following the tripping of one of the circuit-breakers can have no effect. It will be noted that these pallet-switches 224 do not affect the tripping-circuits which are established by the phase-relays.

Although the control afforded by the additional pallet-switches 224 may be included in the circuit of Fig. 7, for simplicity in illustration the showing thereof has been restricted to Fig. 9.

As previously explained, the directional phase-relays 181, 182 and 183 may have their voltage-windings 194 each connected across two phase-conductors. For example, the phase-B directional relay 182 in Fig. 9 may have its voltage-winding connected across the phase-conductors A and C, and the phase-C directional relay 183 may have its voltage-winding connected across the phase-conductors A and B. This connection is illustrated in Fig. 9, for the phase-A directional relay 181, which has its voltage-winding 194 connected across the phase-conductors B and C. The relay-adjustments required to provide proper directional operation of the relays for this connection are understood in the art. This connection is desirable for the reason that it tends to maintain adequate voltage for the directional phase-relays on phase-to-phase faults and on phase-to-phase-to-ground faults.

For convenience in illustration, separate sets of current-transformers, 161—162—163 and 161'—162'—163' have been illustrated for each phase-sequence current to be derived from the circuit 119 in Fig. 9, although, as is well understood in the art, certain of the current-transformers which are associated with any one phase-conductor may be combined, in actual practice, in order to decrease the number of current-transformers which are required.

In the embodiments of my invention which I have so far specifically described, it has been assumed, as was actually the case in the installation previously made, that the amount of power which could be transmitted over a single sound conductor, in the event of a double line-to-ground fault, would be sufficiently small, from a synchronizing standpoint, so that the operating company would not wish to leave the single sound conductor connected, while attempting to clear a double ground fault. There appear to be occasions, however, where many operating companies may desire to avail themselves of the small, but by no means negligible, amount of power which can be transmitted over a single conductor of a grounded-neutral three-phase system, and in such cases it is desirable to embody my invention in a form which will make this operation possible.

It will be noted that where my ground-fault phase-selector relays SA, SB and SC have been energized from the negative and zero-sequence currents so as to directionally compare these two components, as was the case with the relays SA, SB and SC in Fig. 1 and the relays 131, 132 and 133 in Fig. 7, the response of these phase-selector relays to a double line-to-ground fault would be to indicate that the remaining or sound phase is faulted. Thus, referring to Fig. 10, it will be seen that, in the case of a B-to-C-to-ground fault, the phase-$a$ negative and zero-sequence current-components $I_{A2}$ and $I_{A0}$ are in phase with each other, which, it will be observed from Fig. 3a, is just the condition necessary to a response of the phase-selector relay SA or 131, to indicate a phase-A-to-ground fault.

Figure 8C:
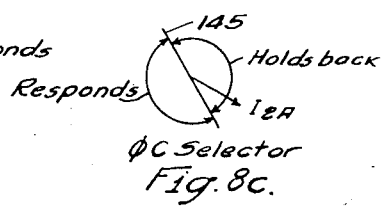
Figure 11:
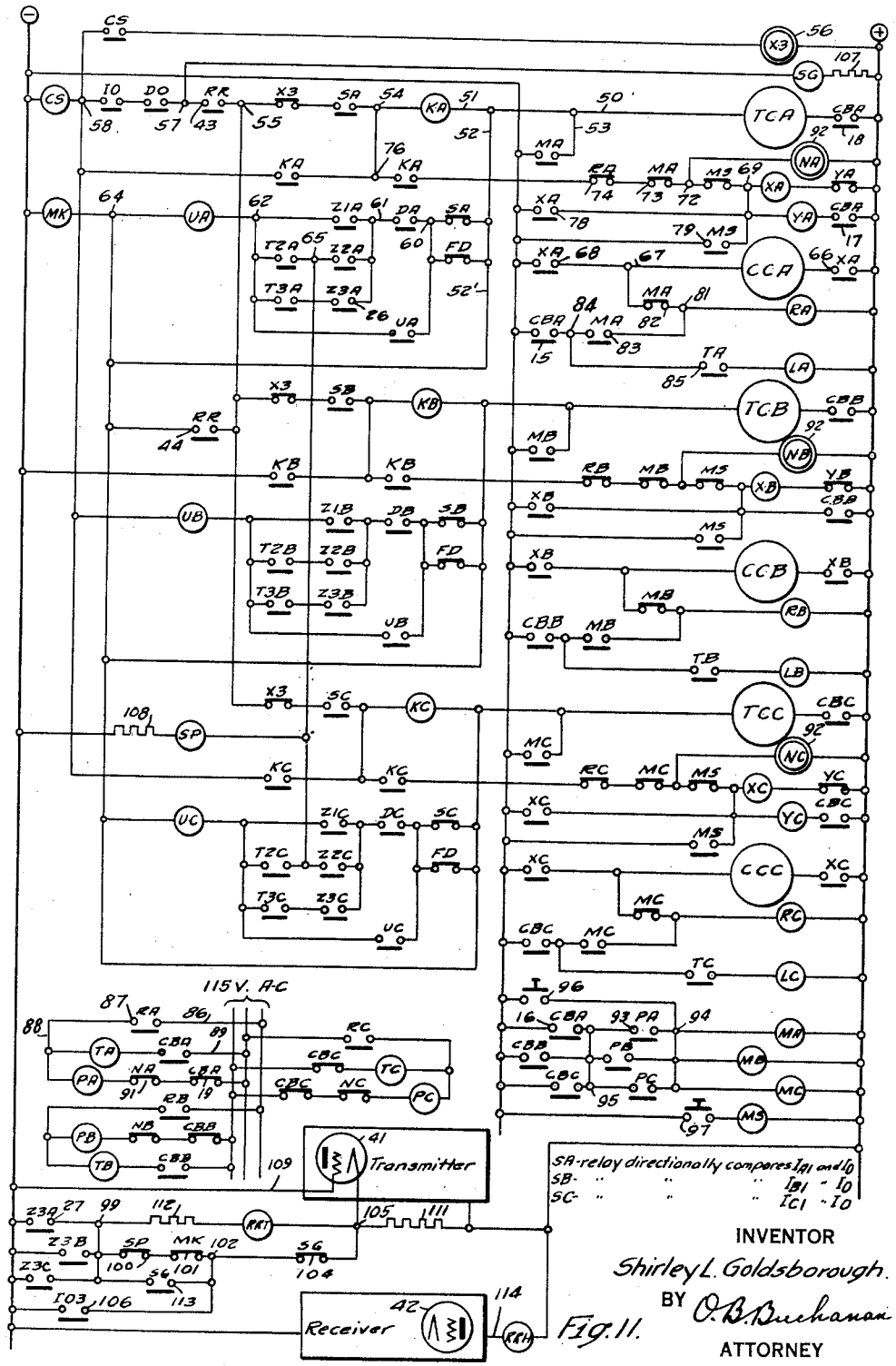
Fig. 11 is an across-the-line diagram similar to Fig. 2, illustrating an alternative form of embodiment.

If, however, instead of directionally comparing the negative and zero phase-sequence components, the directional comparison were made between the positive-sequence component and the negative-sequence component, as in the case of the phase-selector relays 131, 132 and 133 of Fig. 9, or if the directional comparison were made between the respective positive-sequence components $I_{A1}$, $I_{A2}$ and $I_{A3}$, and the corresponding zero-sequence components $I_{A0}$, $I_{B0}$ and $I_{C0}$, as is indicated in Fig. 11, it will be observed, from Fig. 10, that a B-to-C-to-ground fault, for example, produces a phase-$a$ positive-sequence current $I_{A1}$ which is 180° out of phase with either the negative-sequence phase-$a$ current $I_{A2}$ or the zero-sequence phase-$a$ current $I_{A0}$. Reference to Figs. 8a, 8b and 8c will show that, when the phase-$a$ polarizing current falls in the center of the holding-back or non-responsive region of the selector-operation, the other two phases will both fall in the responsive region of the relay, so that the phase-selectors for phases B and C will both respond correctly indicating faults on said phases B and C, in such a case.

In Fig. 11, therefore, I have indicated an embodiment of my invention, which differs from that which is shown in Fig. 2 in utilizing phase-selector relays SA, SB and SC which are responsive to the respective positive and zero phase-sequence components, and in omitting all of the MK contacts except the back-contact 101 in the carrier-control circuit. In Fig. 2, the three MK make-contacts brought about the tripping of all three of the trip-coils TCA, TCB and TCC whenever any one of these trip-circuits was energized through any one of the three phase-fault tripping-circuits 52. In Fig. 2, also, the three MK back-contacts 75 in the reclosing control-circuit prevented the energization of the respective closing relays XA, XB and XC after the three-pole tripping operation which resulted from any phase-fault relaying-response.

In the operation of the protective system shown in Fig. 11, however, I rely upon the three phase-selector relays SA, SB and SC to properly select or indicate the faulted phase or phases, in the event of either a single ground fault or a double ground fault on the protected line-section; and I rely upon the phase-fault relays D and Z to properly select or indicate which pole or poles of the circuit-breakers is or are to be tripped in the event of any other kind of fault on the protected line-section.

The elimination of the MK make-contacts allows the phase-fault directional elements DA, DB and DC of Fig. 11 to select one of the phases involved in a phase-to-phase fault, in accordance with the customary operation of these directional relays, thus effecting a single-pole tripping-operation in response to such a phase-to-phase fault on the protected line-section. In the case of a fault involving all three phases of the protected line-section, all three of the phase-fault directional elements DA, DB and DC respond, to cause tripping of all three poles of the circuit breakers.

The omission of the three MK back-contacts 75 of Fig. 2 enables the Fig. 11 system to perform a reclosing operation following a phase-fault relaying-operation, as well as in the case of a ground-fault relaying operation. This is often desirable, because, in Fig. 11, the effect of a phase-fault relaying operation, in the event of an ungrounded phase-fault involving only two of the conductors of the protected line-section, is to produce a single-pole tripping-operation, and it is necessary to promptly restore to service the affected line-conductor or conductors, in any case where less than all three phases are switched out of service, so as to avoid the continued transmission of single-phase power. In the event that any one of the three single-pole circuit-breakers CBA, CBB or CBC should trip out, and remain open for any material length of time, without automatic reclosure, the protective system shown in Fig. 11 operates in the same manner described for Fig. 2, to bring about an opening operation of the remaining breakers, through the operation of the relays MA, MB and MC, as previously described.

The protective system shown in Fig. 11 also permits and causes an automatic reclosing breaker-operation of each of the circuit breakers in the event of a three-pole switching-operation which would result from a three-phase fault. It is believed to be obvious, however, that in any case in which such a reclosing operation is not desired, after a three-pole tripping-operation, suitable interlocks may be introduced for preventing such a reclosing operation, while still permitting an automatic reclosure, either once or for predetermined number of times, after a tripping operation effecting only one or two of the poles of the circuit breakers.

I wish it to be understood, however, that the MK back-contacts 75 of Fig. 2 may be utilized also in Fig. 11, thus blocking a reclosing operation, even after a single-pole tripping-operation resulting from a phase-to-phase fault, in which case I would rely upon the contactor-switches MA, MB and MC, or other equivalent means, to trip out the other two poles of the circuit-breakers at the expiration of the time-interval controlled by the reclosing-circuit timer TA, TB or TC, as the case may be.

It will be noted: that I have derived a polyphase electrical quantity from the line; that I have utilized one or more phase-sequence networks for deriving, from that poly-phase electrical quantity, two different relaying quantities of different phase-sequence compositions such that the phase-angle relationships between said two relaying quantities vary by approximately 120° in accordance with which phase-conductor of the line is grounded; and that I have provided phase-responsive force-producing means, energized by said two relaying quantities, for selectively responding to the aforesaid phase-angle relationships. While I have selected currents, rather than voltages or any other polyphase electrical quantity to be derived from the line; while I have selected phase-sequence filters which produce relatively pure phase-sequence quantities rather than mixtures of phase-sequence components; and while I have selected a plurality of directionally responsive single-phase relays as the means at present preferred for effecting the phase-angle comparison—I wish it understood that my invention, in its broader aspects, is not at all limited to these various details of embodiment.

It will be further noted that I have provided a ground-fault selector-means which is just as sensitive as the conventional directional zero-phase-sequence ground-relay which responds to ground faults in general, without selection as to the line-conductor which is grounded, so that my selector-means may be utilized to supplement the conventional directional ground-relay.

In the foregoing, and many other respects various features of the exemplary forms of embodiment which I have illustrated are not essential to the primary objects of my invention, and I wish it to be understood that the various illustrated forms of embodiment are susceptible of modification and change, through the medium of adding, subtracting, substituting or modifying various details thereof, to meet the specific requirements of any particular protective system. I desire, therefore, that the appended claims shall be given the broadest interpretation permitted by their language.

I claim as my invention:

1. A ground-fault phase-selector apparatus for selectively responding to the particular phase-conductor of a polyphase line which may be subject to a ground-fault condition from less than all of the phase-conductors of the line to ground, said apparatus comprising: means for deriving, from the line, two different relaying quantities of different phase-sequence compositions such that the phase-angle relationships between said two relaying quantities vary in accordance with which phase-conductor of the line is grounded, at least one of said relaying quantities being a polyphase quantity having one phase for each phase-conductor of the line; a plurality of force-producing means, one for each phase-conductor of the line, each force-producing means having two energizing-circuits and producing a force which is responsive to the phase-angle relationship between the currents in its two energizing-circuits; and circuit-means for energizing the two energizing-circuits of each force-producing means from said two relaying quantities, with phases corresponding in such manner that each force-producing means produces a force in opposite directions according to whether its own line-conductor is or is not faulted, under predetermined conditions.

2. A ground-fault phase-selector apparatus for a three-phase line, comprising: three directionally responsive force-producing elements, one for each phase-conductor of the line, each force-producing element having two single-phase energizing-circuits and producing a force which is responsive to the relative directions of the currents in its two energizing-circuits, means for deriving, from the line, two different relaying quantities of different phase-sequence compositions such that the phase-angle relationships between said two relaying quantities vary in accordance with which phase-conductor of the line is grounded, at least one of said relaying quantities being a three-phase quantity having one phase for each phase-conductor of the line, and circuit-means for energizing the two energizing-circuits of each force-producing element from the corresponding phase of each of said two relaying quantities, each force-producing element producing a force in one direction when a single ground-fault occurs on its own line-conductor and producing a force in the opposite direction when a single ground-fault occurs on either other line-conductor.

3. A ground-fault phase-selector apparatus for selectively responding to the particular phase-conductor of a polyphase line which may be subjected to a ground-fault condition from less than all of the phase-conductors of the line to ground, said apparatus comprising: means for deriving a polyphase electrical quantity from the line; means for deriving, from that polyphase electrical quantity, two different relaying quantities of different phase-sequence compositions such that the phase-angle relationships between said two relaying quantities vary by approximately 120° in accordance with which phase-conductor is grounded; and phase-responsive force-producing means, energized by said two relaying quantities, for selectively responding to the aforesaid phase-angle relationships.

4. A ground-fault phase-selector apparatus for a three-phase line, comprising: a plurality of single-phase directional elements, one for each phase-conductor of the line, each directional element having two coils; means for deriving a polyphase relaying quantity from the line; means for substantially segregating, from that polyphase relaying quantity, all phases of two of its phase-sequence components, each substantially unmixed with any other component; and circuit-means for supplying the corresponding phases of the two phase-sequence components to the two coils of the respective directional elements, each according to its own phase.

5. A control system for a plurality of single-pole circuit-interrupters in the several phase-conductors of a polyphase line-section, comprising selective fault-responsive relaying-means for determining which of the circuit-interrupters needs to be opened in order to remove a fault from the protected line-section, means responsive to such determination for at all times causing an opening operation of the minimum number of circuit-interrupters necessary for safely assuring the clearing of the fault from the line-section, means operative only in the event that less than all of phase-conductors of the polyphase line have been open-circuited to promptly reclose the circuit-interrupters in the open-circuited phase-conductor or conductors, means for limiting the number of reclosing operations occurring in a predetermined time, and means for causing opening operations of the circuit-interrupters in the remaining line-conductors in response to an opening of less than all of the circuit-interrupters unaccompanied by a reclosing thereof.

6. Fault-responsive protective relaying means for controlling each of a plurality of single-pole circuit-interrupters in the several phase-conductors of a polyphase line, comprising the combination, with said circuit-interrupters, of selective ground-fault relaying-means for determining which of the line-conductors is faulted, in the event of a single line-to-ground fault on the line, and for causing an opening-operation of only the single-pole circuit-interrupter in that line-conductor, and for automatically thereafter at times causing a single-pole closing-operation of the same circuit-interrupter; means for limiting the number of automatic single-pole closing-operations in the event of a sustained or restriking fault on the same line-conductor; means for causing open-operations of the remaining single-pole circuit-interrupters in response to an opening-operation of said circuit-interrupter in the fault line-conductor, unaccompanied by a reclosing-operation thereof; and phase-fault relaying-means responsive only to a predetermined fault-condition involving two or more of the line-conductors for causing opening-operations of a plurality of the single-pole circuit-interrupters.

7. Fault-responsive protective relaying means for controlling each of a plurality of single-pole circuit-interrupters in the several phase-conductors of a polyphase line, comprising the combination, with said circuit-interrupters, of phase-fault relaying-means responsive only to a predetermined fault-condition involving two or more of the line-conductors for causing opening-operations of one or more of the single-pole circuit-interrupters, selective ground-fault relaying-means for determining which of the line-conductors is faulted, in the event of a single line-to-ground fault on the line, and for causing an opening-operation of only the single-pole circuit-interrupter in that line-conductor; means for automatically at times reclosing said single-pole circuit-interrupter; and means for blocking such reclosure in response to a predetermined operation of said phase-fault relaying-means.

8. Fault-responsive protective relaying means for controlling each of a plurality of single-pole circuit-interrupters in the several phase-conductors of a three-phase line, comprising the combination, with said circuit-interrupters, of single-pole relaying-means for at times causing an opening-operation of only one single-pole circuit-interrupter at the relaying station, three-pole relaying means for at times causing opening-operations of all three of the single-pole circuit-interrupters, and means responsive to an operation of the single-pole relaying-means, unaccompanied by an operation of the three-pole relaying-means, for at times causing a closing-operation of the affected single-pole circuit-interrupter.

9. Fault-responsive protective relaying means for controlling the respective opening-means of three single-pole circuit-interrupters in the three phase-conductors of a three-phase line, comprising the combination, with said circuit-interrupters, of selective relaying means for determinating which of the line-conductors is faulted, in the event of a line-to-ground fault, means responsive to said selective relaying-means for causing an opening operation of only the circuit-interrupter in the faulted line-conductor, phase-fault relaying-means for responding to a fault-condition involving more than one line-conductor of the protected line for causing a circuit-interrupter opening operation, and means operative when any selective relaying-means responds for blocking a circuit-interrupter opening-operation as a result of a response of a phase-fault relaying-means.

10. Fault-responsive protective relaying means for controlling the respective opening-means of three single-pole circuit-interrupters at both ends of a protected three-phase line-section for single-pole switching thereof, comprising selective fault-responsive relaying-means for determining which of the circuit-interrupters at both ends of the protected line-section needs to be opened in order to remove a fault within the protected line-section, circuit-means responsive to said selective relaying-means for substantially simultaneously energizing the opening-means of the minimum number of circuit-interrupters at the two ends of the line-section necessary for clearing the fault from the line-section, reclosing-means associated with each individual single-pole circuit-interrupter, and means for preventing a sustained open condition of any one of said circuit-interrupters at either end of the line-section and for thereafter opening all of the circuit-interrupters at that end.

11. Fault-responsive protective relaying means for controlling the respective opening-means of three single-pole circuit-interrupters in the three phase-conductors of a three-phase line, comprising the combination, with said circuit-interrupters, of selective relaying-means for determining which of less than all of the circuit-interrupters needs to be opened in order to safely assure the clearing of a fault on the line, and for energizing the appropriate circuit-interrupter opening-means, and means responsive to an open condition of any one of said circuit-interrupters for thereafter preventing, for a time, a selective determination of another single line-conductor which appears to be faulted.

12. Fault-responsive protective relaying means for controlling the respective opening-means of three single-pole circuit-interrupters in the three-phase-conductors of a three phase line, comprising the combination, with said circuit-interrupters, of selective relaying-means for determinating which of the line-conductors is faulted, in the event of a single line-to-ground fault, circuit-means for energizing only one of the respective circuit-interrupter opening-means in response to a response of its associated phase-selector relay, and means responsive to an open condition of any one of said circuit-interrupters for thereafter preventing, for a time, a selective determination of another single line-conductor which appears to be faulted.

13. Fault-responsive protective relaying means for controlling the respective opening-means of three single-pole circuit-interrupters in the three phase-conductors of a three-phase line, comprising the combination, with said circuit-interrupters, of ground-fault phase-selector relaying-means for selectively responding to the one particular phase-conductor which is faulted in case of a single line-to-ground fault, but without reliable discrimination as to certain other fault-conditions or as to the magnitude of the fault-current or the direction of the fault-location, a common ground-fault relaying-means for selectively responding to a predetermined magnitude and direction of a ground-fault quantity in said line, and circuit-means for energizing only one of the protective circuit-interrupter opening-means in response to a selection by said phase-selector relaying-means and a response of the common ground-fault relaying-means.

14. Fault-responsive protective relaying means for controlling the respective opening-means of three single-pole circuit-interrupters in the three phase-conductors of a three-phase line, comprising the combination, with said circuit-interrupters, of ground-fault phase-selector relaying-means for selectively responding to the one particular phase-conductor which is faulted in case of a single line-to-ground fault, but without reliable discrimination as to certain other fault-conditions or as to the magnitude of the fault-current or the directoin of the fault-location, a common ground-fault relaying-means for selectively responding to a predetermined magnitude and direction of a ground-fault quantity in said line, circuit-means for energizing only one of the respective circuit-interrupter opening-means in response to a selection by said phase-selector relaying-means and a response of the common ground-fault relaying-means, and means responsive to an energizing operation of any one of said circuit-means for interposing an impediment against an energizing operation of the other two circuit-means for a predetermined time.

15. Carrier-current protective relaying means for controlling the respective opening-means of three single-pole circuit-interrupters in the three phase-conductors of a three-phase line, comprising the combination, with said circuit-interrupters, of a normally non-transmitting carrier-current transmitter; a carrier-restrained receiver-relay; ground-fault phase-selector relaying-means for selecting the faulted phase-conductor in the event of a line-to-ground fault, but without reliable discrimination as to certain other fault-conditions or as to the magnitude of the fault-current or the direction of the fault-location; a common ground-fault relaying-means for selectively responding to a predetermined magnitude of a ground-fault quantity in said line at the relaying point and for further selectively responding to an into-the-line-looking direction of said ground-fault quantity at the relaying point; phase-fault relaying-means for selectively responding to a predetermined magnitude of a phase-fault line-quantity involving a plurality of phase-conductors of the line at the relaying point and for further selectively responding to an into-the-line-looking direction of said phase-fault quantity at the relaying point; sensitive phase-fault and ground-fault carrier-starting means for starting carrier-current transmission upon the occurrence of a fault-condition on the line; means responsive to a predetermined ground-fault response of said common ground-fault relaying means for stopping carrier-current transmission, said predetermined ground-fault response including at least the directional part of the response; means responsive to a predetermined phase-fault response of said phase-fault relaying-means for stopping carrier-current transmission, said predetermined phase-fault response including at least the directional part of the response; means for energizing the appropriate circuit-interrupter opening-means in response to a selection by said phase-selector relaying-means, a response of the common ground-fault relaying-means, and a response of the carrier-restrained receiver-relay; and phase-fault tripping-means for at times energizing the appropriate circuit-interrupter opening-means, said phase-fault tripping-means including means responsive to a non-responsive condition of said phase-selector relaying-means, a response of said phase-fault relaying-means, and a response of the carrier-restrained receiver-relay.

16. Carrier-current protective relaying-means for controlling the opening-means of a circuit-interrupter in a polyphase line, comprising the combination, with said circuit-interrupter, of a normally non-transmitting carrier-current transmitter; a carrier-current receiver; a receiver-relay having an operating-means and means for preventing its operation; ground-fault relaying-means responsive to a predetermined magnitude of a ground-fault quantity in said line and further responsive to an into-the-line-looking direction of said ground-fault quantity at the relaying point; phase-fault relaying-means responsive to a predetermined magnitude of a phase-fault quantity in said line and further responsive to an into-the-line-looking direction of said phase-fault quantity at the relaying point; sensitive phase-fault and ground-fault carrier-starting means for starting carrier-current transmission upon the occurrence of a fault-condition on the line; means responsive to a predetermined ground-fault response of said ground-fault relaying-means for stopping carrier-current transmission, said predetermined ground-fault response including at least the directional part of the response; means responsive to a predetermined phase-fault response of said phase-fault relaying-means for stopping carrier-current transmission, said predetermined phase-fault response including at least the directional part of the response; circuit-means for energizing the operating-means of said receiver-relay in response to a response of said sensitive phase-fault carrier-starting means, accompanied by either said predetermined ground-fault response or said predetermined phase-fault response; circuit-means for energizing the operating-means of said receiver-relay in response to a response of said sensitive ground-fault carrier-starting means, accompanied by said predetermined ground-fault response; said last-mentioned circuit-means including a back-contact of a directionally responsive phase-fault relaying-means, shunted by a front-contact of a directionally responsive ground-fault relaying-means; carrier-receiver means responsive to a response of the carrier-current receiver for effectively energizing the means for preventing an operation of the receiver-relay; and circuit-means for energizing an opening-means of the circuit-interrupter in response to a response of the receiver-relay, accompanied by a response of either said ground-fault relaying-means or said phase-fault relaying-means.

17. In an electrical system, a polyphase circuit having a plurality of phase conductors, and means responsive to the condition of said polyphase circuit when a ground fault occurs on one of said phase conductors for interrupting service on only said one of said phase conductors, said last-named means including means for deriving from said polyphase circuit a pair of sequence components having phase relationships varying with the specific one of said phase conductors having a ground fault thereon, and circuit control means responsive to the phase relationship of said components.

18. In an electrical system, a polyphase circuit having a plurality of phase conductors, and means responsive to the condition of said polyphase circuit when a ground fault occurs on one of said phase conductors for interrupting service on only said one of said phase conductors, said last-named means including an independent circuit breaker for each of said phase conductors, means for deriving from said polyphase circuit first and second quantities dependent respectively on first and second sequence components of said polyphase circuit, said quantities having a phase relationship dependent on the phase relationship of said sequence components, control means responsive to the phase relationship of said quantities, said sequence components having a phase relationship varying with the specific one of said phase conductors which is subjected to a ground fault, and separate tripping means for each of said circuit breakers, each of said tripping means being responsive to a different condition of said control means.

19. In an electrical system, a polyphase circuit having a plurality of phase conductors, a separate circuit breaker for each of said phase conductors, independent tripping means for tripping each of said circuit breakers, each of said tripping means including control means having a plurality of windings and means responsive to the energization of said windings when the currents flowing therethrough have a predetermined phase relationship for tripping the associated one of said circuit breakers, means for energizing a first one of said windings on each of said control means in accordance with negative sequence current in said polyphase circuit, and means for energizing a second one of said windings on each of said control means in accordance with zero sequence current in said polyphase circuit, each of said control means being designed to respond to a different phase relationship of said negative and zero sequence currents.

20. In an electrical system, a polyphase circuit having a plurality of phase conductors, a separate circuit breaker for each of said phase conductors, independent tripping means for tripping each of said circuit breakers, each of said tripping means including control means having a plurality of windings and means responsive to the energization of said windings when the currents flowing therethrough have a predetermined phase relationship for tripping the associated one of said circuit breakers, means for energizing a first one of said windings on each of said control means in accordance with the positive sequence current in said polyphase circuit, and means for energizing a second one of said windings on each of said control means in accordance with the zero sequence current in said polyphase circuit.

each of said control means being designed to respond to a different phase relationship of said positive and zero sequence currents.

21. In an electrical system, a polyphase circuit having a plurality of phase conductors, a separate circuit breaker for each of said phase conductors, independent tripping means for tripping each of said circuit breakers, each of said tripping means including control means having a plurality of windings and means responsive to the energization of said windings when the currents flowing therethrough have a predetermined phase relationship for tripping the associated one of said circuit breakers, means for energizing a first one of said windings on each of said control means in accordance with the negative sequence current in said polyphase circuit, and means for energizing a second one of said windings on each of said control means in accordance with the positive sequence current in said polyphase circuit, each of said control means being designed to respond to a difference phase relationship of said negative and positive sequence currents.

22. In an electrical system, a polyphase circuit having a plurality of phase conductors, a separate circuit breaker for each of said phase conductors, independent tripping means for tripping each of said circuit breakers, means responsive to the condition of said circuit when a ground fault occurs on one of said phase conductors for operating said tripping means to trip only the circuit breaker associated with the phase conductor having said ground fault thereon, said last-named means being effective for a tripping operation for a fault current having a magnitude less than the full load current rating of said circuit, and means responsive to the condition of said circuit when a fault occurs affecting more than one of said conductors for operating said tripping means to trip all of said circuit breakers.

23. In an electrical system, a polyphase circuit having a plurality of phase conductors, a separate circuit breaker for each of said phase conductors, independent tripping means for each of said circuit breakers, each of said tripping means including a polyphase control device, means for energizing one phase of each of said control devices in accordance with a first sequence component of current flowing in said polyphase circuit, and means for energizing a second phase of each of said control devices in accordance with a second sequence component of current flowing in said polyphase circuit, each of said control devices being designed to respond to a different phase relationship between said sequence components.

24. In an electrical system, a source of polyphase energy, a polyphase circuit having a plurality of phase conductors connected to said source for normally transmitting current therefrom to a load, and control means responsive to the condition of said polyphase circuit, said control means including a polyphase control device responsive to the phase relationship of the separate phases employed for energizing said control device, means for energizing one phase of said polyphase control device in accordance with a first sequence component of said polyphase circuit, means for energizing a second phase of said polyphase control device in accordance with a second sequence component of said polyphase circuit, and means responsive to the operation of said polyphase control device for opening only a single phase-conductor of said polyphase circuit.

25. In an electrical system, a source of polyphase energy, a polyphase circuit having a plurality of phase conductors connected to said source for normally transmitting current therefrom to a load, and control means responsive to the condition of said polyphase circuit when a ground fault occurs on any of said phase conductors, said control means including a plurality of polyphase control devices responsive to the phase relationship of the separate phases employed for energizing said control devices, means for energizing one phase of each of said polyphase control devices in accordance with a first sequence component of said polyphase circuit, means for energizing a second phase of each of said polyphase control devices in accordance with a second sequence component of said polyphase circuit, said polyphase control devices being respectively adjusted for response to different phase relationships of said sequence components, and means responsive to the operation of said polyphase control device for opening only a single phase-conductor of said polyphase circuit.

26. In an electrical system, a source of polyphase energy, a polyphase circuit having a plurality of phase conductors connected to said source for normally transmitting current therefrom to a load, and control means responsive to the condition of said polyphase circuit, said control means including at least two phase-elements reacting with each other in such manner as to be responsive to the phase relationship therebetween, means for energizing one phase of said control means in accordance with a first sequence component of a polyphase electrical quantity of said polyphase circuit, and means for energizing a second phase of said control means in accordance with a second sequence component of the same polyphase electrical quantity of said polyphase circuit.

27. In an electrical system, a source of polyphase energy, a polyphase circuit having a plurality of phase conductors connected to said source for normally transmitting current therefrom to a load, and control means responsive to the condition of said polyphase circuit when a ground fault occurs on any of said phase conductors, said control means including a plurality of polyphase control devices responsive to the phase relationship of the separate phases employed for energizing said control devices, means for energizing one phase of each of said polyphase control devices in accordance with a first sequence component of a polyphase electrical quantity of said polyphase circuit, and means for energizing a second phase of each of said polyphase control devices in accordance with a second sequence component of the same polyphase electrical quantity of said polyphase circuit, said polyphase control devices being respectively adjusted for response to different phase relationships of said sequence components.

28. In an electrical system, a polyphase circuit having a plurality of phase conductors, a source of polyphase energy for energizing said polyphase circuit, the energization of said polyphase circuit under ground fault conditions including a first sequence component and a second sequence component having a phase relationship which varies in accordance with the specific one of said phase conductors on which the ground fault occurs, first control means energized solely in accordance with said sequence components and responsive to said phase relationship for selecting the phase conductor on which the ground fault occurs, and second control means responsive to the condition of said polyphase circuit when a phase-to-phase fault occurs thereon, said second control means having a time delay sufficient to permit prior operation of said first control means.

29. In an electrical system, a polyphase circuit having a plurality of phase conductors, a source of polyphase energy for energizing said polyphase circuit, the energization of said polyphase circuit under ground fault conditions including a first sequence component and a second sequence component having a phase relationship which varies in accordance with the specific one of said phase conductors on which the ground fault occurs, first control means energized solely in accordance with said sequence components and responsive to said phase relationship for selecting the phase conductor on which the ground fault occurs, second control means responsive to the condition of said polyphase circuit when a phase-to-phase fault occurs thereon, and means permitting a control operation of said second control means only when said first control means is in a predetermined condition.

30. In an electrical system, a polyphase circuit having a plurality of phase conductors, a source of polyphase energy for energizing said polyphase circuit, a separate circuit breaker associated with each of said phase conductors, first control means responsive to the condition of said polyphase circuit when a ground fault occurs on any of said phase conductors for tripping only the circuit breaker associated with the faulty phase conductor, second control means responsive to the condition of said polyphase circuit when a phase-to-phase fault occurs thereon for tripping said circuit breaker, and means responsive to a tripping operation of one of said circuit breakers for rendering said first control means ineffective for further operation.

SHIRLEY L. GOLDSBOROUGH.